(12) United States Patent
Ratza et al.

(10) Patent No.: US 7,837,273 B1
(45) Date of Patent: Nov. 23, 2010

(54) SEAT SUSPENSION

(75) Inventors: Clifton J. Ratza, Grand Rapids, MI (US); Trent A. Eekhoff, Grand Rapids, MI (US)

(73) Assignee: Milsco Manufacturing Company, Milwaukee, WI (US)

( * ) Notice: Subject to any disclaimer, the term of this patent is extended or adjusted under 35 U.S.C. 154(b) by 255 days.

(21) Appl. No.: 11/845,872

(22) Filed: Aug. 28, 2007

Related U.S. Application Data

(62) Division of application No. 10/922,053, filed on Aug. 19, 2004, now Pat. No. 7,523,988.

(60) Provisional application No. 60/497,582, filed on Aug. 25, 2003.

(51) Int. Cl.
*A47C 7/02* (2006.01)
(52) U.S. Cl. ............... 297/452.56; 297/452.55; 297/452.49
(58) Field of Classification Search ............ 297/452.49, 297/452.52, 452.54, 452.55, 452.56
See application file for complete search history.

(56) References Cited

U.S. PATENT DOCUMENTS

| | | | | |
|---|---|---|---|---|
| 2,085,475 A | * | 6/1937 | Saives | 297/452.56 |
| 2,316,628 A | * | 4/1943 | Schaffner | 267/102 |
| 3,107,944 A | * | 10/1963 | Baermann | 297/452.56 |
| 3,176,323 A | * | 4/1965 | Degen | 5/238 |
| 3,649,077 A | * | 3/1972 | Flint | 297/452.52 |
| 3,819,232 A | * | 6/1974 | Wagner | 297/452.21 |
| 4,222,134 A | * | 9/1980 | Degen | 5/191 |
| 4,638,517 A | * | 1/1987 | Yang et al. | 5/236.1 |
| 4,685,738 A | * | 8/1987 | Tinus | 297/452.56 |
| 5,405,179 A | * | 4/1995 | Jih | 297/452.49 |
| 6,361,117 B1 | * | 3/2002 | Tate | 297/452.56 |
| 6,733,084 B2 | * | 5/2004 | Butler | 297/452.56 |
| 7,347,499 B2 | * | 3/2008 | Slabaugh et al. | 297/452.56 |

* cited by examiner

*Primary Examiner*—Sarah B McPartlin
(74) *Attorney, Agent, or Firm*—Boyle Fredrickson, S.C.

(57) ABSTRACT

A seat suspension that includes at least one beam spring that extends across a seat pan. In one preferred embodiment, a pair of such springs is carried by the pan. The springs preferably differ in compliance from one another and from a mesh load supporting grid that is connected to each spring. One such arrangement produces a suspension of progressive construction that enables the seat to handle a wide range of shocks, bumps, jolts, and vibration of varying frequencies and magnitudes.

22 Claims, 13 Drawing Sheets

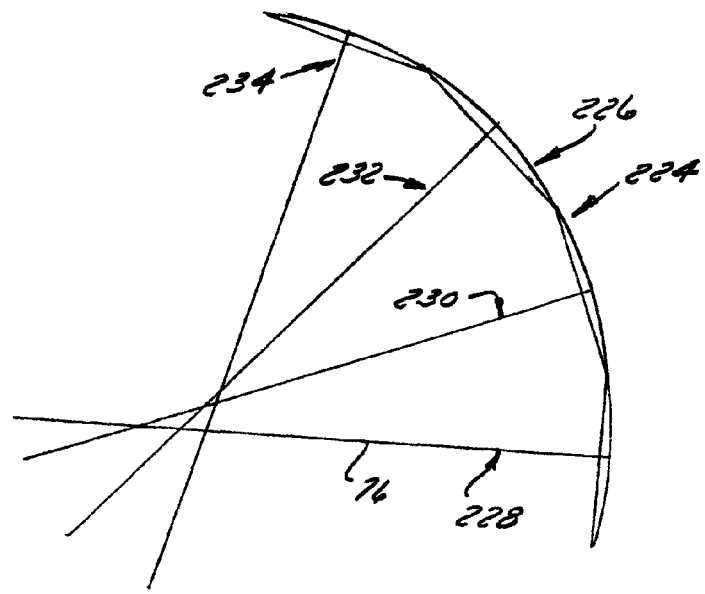
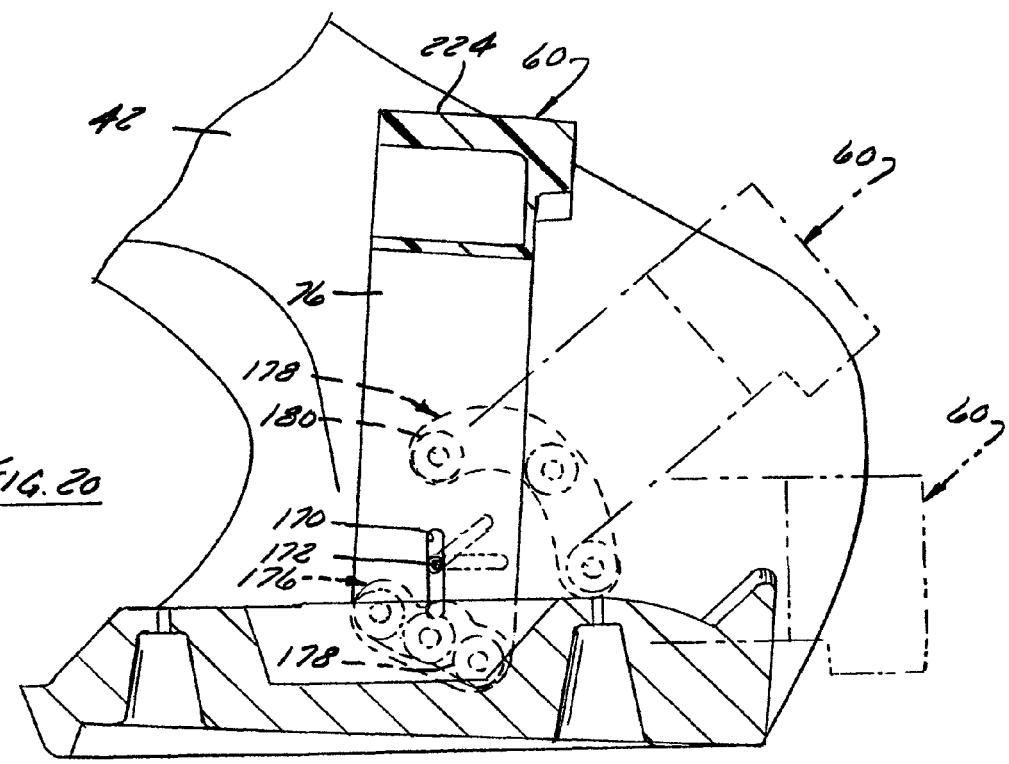

SEAT SUSPENSION

CROSS REFERENCE TO RELATED APPLICATION

This application is a divisional of U.S. application Ser. No. 10/922,053 Aug. 19, 2004 now U.S. Pat. No. 7,523,988, which claims the benefit under 35 U.S.C. §119(e) of U.S. Provisional Application Ser. No. 60/497,582, filed Aug. 25, 2003, the entirety of which is expressly incorporated by reference herein.

FIELD OF THE INVENTION

This invention primarily relates to a seat suspension, and more particularly to a mesh or fabric seat suspension.

BACKGROUND OF THE INVENTION

Vehicle seats in recreational watercraft have included flip up bolster systems for a number of years. Typically, flip up bolster systems involve having the forward edge of the seating surface (bolster) as a separate part from the rear portion of the seating surface. This forward portion of the seat complete with padding, upholstery and a structural core is connected to the remainder of the seat with a hinging system or mechanical linkage that enables the forward portion of the seat to rotate or slide back and up with respect to the remainder of the seating surface until the forward portion of the seat is suspended several inches above the rear portion of the seat. In the raised position, the bolster provides a higher seating position for the operator and or passenger of the vehicle.

Operating or riding in a watercraft with the bolster in the raised position allows better visibility than would be possible if the bolster was not elevated. When a watercraft is accelerating from slow speed operation to higher speed operation, the bow of the boat often rises significantly, temporarily restricting the occupant's visibility of the area immediately in front of the boat. By moving the bolster of the seat to the raised position, and occupying that position, the operator can significantly improve his or her field of vision. A raised seating position in a watercraft can also be advantageous when the occupants wish to look carefully down into the water to see submerged obstacles or to look for objects on the water such as water skiers, lines, docks, floating debris, fishing lures, etc.

Improving the visibility of the operator and or passenger of a boat can significantly reduce the likelihood of collisions with unseen objects, so seats with flip up bolsters are viewed as a safety enhancement. Seats with flip up bolsters are now becoming the norm in marine seating.

For marine seats with flip up bolsters, the seat is typically composed of a bucket seat shell that provides a means of supporting the other components of the seat. Generally the bucket seat shell is composed of a back area, two arm areas and a lower area connecting the arms and back that provides a surface where this shell can be connected to mounting hardware below the seat. The back and arms of the shell are typically fully upholstered with urethane foam padding and a vinyl skin is stapled in place to cover the exposed areas of the shell. Generally, there is a separate seat pan that creates the rear of the seating surface. The seat pan is composed of a structural substrate component and on top of that component, there is a urethane foam cushion. Covering the foam cushion is a vinyl skin that is stapled in place. The upholstered seat pan is generally mounted on the lower connecting surface of the seat shell using screws. The seat pan may also incorporate a shock absorption system in some designs.

The forward portion of the seating surface or bolster typically extends four to six inches back from the front edge of the seating surface. Generally the bolster is composed of a structural but hollow core that is padded with urethane foam on the upper and front edges and then wrapped in vinyl film that is stapled in place to complete the upholstery. There are several means currently being employed for allowing the bolster to move between the lower and upper positions. The first system keeps the bolster in the same vertical orientation when it reaches the raised position. This is accomplished by using a pair of two bar linkage mechanisms with that are attached at each end of the hollow bolster using screws. The two linkage mechanisms are also attached to the seat shell at or near the intersection of the arms of the shell with the lower connecting area of the shell using screws. A fully upholstered seat pan is positioned immediately to the rear of the bolster and between the linkage arms using screws or bolts. A gap between the seat pan and the arms of the shell is provided for the linkage arms to move and the linkages are visible in this gap when the bolster is in the lower position and viewed from above.

The two bar mechanisms are very costly to fabricate and to install in the seat. Typically these mechanisms are composed of a fairly large number of components and are fabricated from aluminum that must be painted in order to resist corrosion and to have an acceptable visual appearance. In addition to the cost to fabricate the linkage mechanisms, assembly to the seat is also costly due to the large number of fasteners required. Because the painted linkage arms are visible at each side of the bolster, overall appearance of the chair suffers because the arms cannot be color-matched to the vinyl in an effective manner.

A second design for these types of mechanisms is to have a metal hinge mechanism in place of the two bar links mentioned in the previous construction. These hinged systems rotate the bolster ninety degrees as it is moved to the raised position, allowing the forward vertical edge of the bolster to become the seating surface. The mechanism is composed of a metal bracket that is fixed to the seat shell using screws. Extending outwards from each bracket is a pivot arm that is free to rotate approximately ninety degrees. This arm is typically connected to a hollow or solid structural bolster that is padded with a urethane foam cushion material and upholstered. Shortcomings of this construction include the cost and painting of the aluminum components and high assembly costs.

Another significant shortcoming of this design is that the hinge system does not provide a forward lock when the bolster is in the raised position. Absence of such a lock allows the bolster to fold down suddenly when the operator shifts his weight as might occur during rough wave conditions. The resulting change in position for the operator could lead to loss of control of the watercraft.

A third construction technique for marine seats with flip up bolsters utilizes a hollow molded bolster mechanism that has hollow arms extending rearwards from the bolster. These arms are several inches across, and the complete bolster part is shaped like a U when viewed from above. The arms contain protrusions that extend into holes within the arm areas of the outer shell of the seat. The protrusions on the bolster arms and recesses in the shell contain corresponding stops that prohibit rearward movement of the bolster when it is in the raised position. The recesses also control rotation of the bolster. The bolster also rests against stops when it is in the lowered position. Typically, the top and front surfaces of the bolster are padded with urethane foam, and the entire assembly must be wrapped in vinyl film that has a zipper sewn to the vinyl.

There are several disadvantages with the previously mentioned construction. Because of the thickness of the arms for the bolster, they intrude several inches into the seating area from the inside of either arm of the seat shell. This protrusion limits the size of the seat pan and detracts from the overall comfort of the seat. In addition, if an internal suspension is included in the seat pan, the limited space reduces the size and shock absorption capabilities of the suspension system.

The hollow bolster in this system is typically manufactured using the blow-molding process. Because the blow-molding process is not capable of producing parts with tight tolerance control, the force required to rotate the bolster from the lower to the raised position varies considerably as a result of wide variations in dimensions required by the process. This is not a desirable condition since consistently smooth and easy movement of the bolster is desirable.

Another disadvantage of this construction is that the bolster component is difficult and costly to upholster due to its U shaped nature. And, the U shape limits the styling possibilities for the seat as well. The presence of the thick arms also precludes the inclusion of raised areas at the edges of the seat cushion that are often included in seat cushions. These raised areas are intended to give the occupant a feeling of security while occupying the seat.

Another significant shortcoming of this design is that this system does not provide a forward lock when the bolster is in the raised position. Absence of such a lock can allow the bolster to fold down suddenly when the operator shifts his weight as might occur during rough wave conditions. The resulting change in position for the operator could lead to loss of control of the watercraft.

Finally, the assembly technique for this design requires that the assembler flex the bolster arms inward to allow insertion of the locking protrusions on the arms into the holes of the arms of the seat shell. This requires considerable force and not all workers are capable of completing the task.

SUMMARY OF THE INVENTION

The present invention is directed to a seat having a seat suspension that includes a webbing of a load bearing fabric that underlies the seat occupant supporting surface of the seat. The present invention is also directed to a movable bolster that preferably is of flip-up operation.

The seat includes a seat pan that has a plurality of retainers that each receive part of a spring that preferably is a beam spring. The webbing is carried by the spring and supported at least some other place spaced from the spring. In one preferred embodiment, the webbing is supported by the seat pan a distance spaced from the spring.

In one preferred embodiment, a pair of spaced apart beam springs are used to support the webbing. Where the beam springs are oriented in a fore-aft direction, one beam spring is located adjacent one side of the seat pan and the other beam spring is located adjacent the other side of the beam spring with the webbing extending therebetween. Where the beam springs are oriented sideways, one of the beam springs is located adjacent a front of the seat pan and the other one of the beam springs is located adjacent a rear of the seat pan.

In one preferred embodiment, one beam spring is less compliant than the other beam spring. Preferably, the spring located adjacent the rear of the seat pan is less compliant than the spring located adjacent the front of the seat pan. In one preferred embodiment, the rear spring is stiffer than the front spring. In another preferred embodiment, the rear spring is shorter than the front spring.

Each beam spring preferably is elongate and has a generally oblong or rectangular cross section with a pair of generally planar top and bottom surfaces, a pair of front and rear side edges, and a pair of ends. Each beam spring preferably is made of a composite material, but can be made of spring steel or the like.

Each retainer includes a pocket that is defined at least in part by a land upon which part of the spring rests adjacent its end. The land preferably is canted relative to the spring end to help accommodate deflection or bending of the spring. The retainer includes a stop against which the end of the spring can abut against when received in the retainer. If the spring is captured in compression between a pair of retainers, each spring end abuts against a respective stop of its retainer.

In one preferred retainer embodiment, each retainer includes a latch bar that overlies part of the spring a distance from the end of the spring and a distance from the stop of the retainer. In another preferred embodiment, a finger extends outwardly from the stop and overlies the land and the end of the spring to keep the spring in the retainer pocket.

The seat pan preferably includes a spring clearance recess or pocket adjacent each retainer that accommodates deflection or bending of the spring during suspension operation. Where each spring is oriented side-to-side, each spring clearance is located inboard of a respective retainer. Where each spring is oriented in a fore-aft direction, one spring clearance is located between one pair of retainers adjacent one side of the seat pan and another spring clearance is located between the other pair of retainers adjacent the other side of the seat pan.

Each retainer preferably is integrally formed in the seat pan. The seat pan preferably provides a seat base that is integrally molded of plastic with each retainer formed substantially simultaneously with the rest of the seat pan.

To help reduce wear and noise, a bearing can be provided between the spring and each retainer. In one preferred embodiment, the bearing preferably extends along part of an edge of the spring and extends along part of the surface of the spring that is disposed toward the land such that at least part of the bearing is disposed between the land of the retainer and the spring. In one preferred embodiment, the bearing is a clip that can be generally U-shaped or a sleeve that is disposed between the retainer and the spring adjacent the end of the spring. In one preferred embodiment, the bearing extends between the land of the retainer and the spring and, where the retainer is equipped with a latch bar, between the latch bar and the spring. Where the retainer is equipped with a retaining tab or finger that overlies the end of the spring, the bearing also preferably is disposed between the spring and the tab or finger.

The webbing is made of a load bearing fabric that preferably is of elastomeric construction. The webbing is anchored to at least one spring preferably along one edge of the webbing. In one preferred embodiment, a clip is used to attach the webbing to the spring. Where a pair of springs are used, a clip is used to attach the webbing to each spring. In another preferred embodiment, the webbing includes a sleeve that slips over each spring.

Where a single spring is used, the seat pan preferably has an integrally formed webbing mount formed therein. The mount is constructed and arranged to receive and retain part of the webbing. One preferred mount construction includes at least one lip that receives a clip attached to the webbing. In one preferred embodiment, the seat pan has a forwardly mounted beam spring that supports the webbing and a plurality of integrally molded mounting posts adjacent the rear of the seat pan that each have a lip that receives part of a clip attached to the webbing.

When mounted in the seat pan, the webbing preferably is pretensioned to provide a taut load supporting surface. A suspension produced in accordance with the invention preferably has a plurality of load or shock absorbing stages, with displacement and stretching of the webbing providing one stage and deflection or bending of at least one spring providing another stage. Where the webbing has a seat cushion overlying it, the seat cushion preferably provides a third stage.

The seat suspension can be used with or without a flip-up type bolster, such as for marine seating applications. Likewise, a flip-up type bolster constructed in accordance with the invention can be used independently of the aforementioned suspension.

A flip-up type bolster constructed in accordance with the invention includes a pair of spaced apart arms, each of which is disposed along one side of a base, such as a seat base or a shell surrounding a seat. Each one of the bolster arms and its corresponding side of the base includes a cam and cam track that guides the cam to guide bolster movement with the cam being carried by one of the bolster arm or the base side and the cam track being carried by the other one of the bolster arm and base side.

The cam preferably is an outwardly extending boss that cooperates with the cam track during bolster movement to guide movement of the bolster. The cam track preferably is not straight and has at least one curved portion that can be of parabolic construction or cause the bolster to trace out at least part of a parabolic path of travel.

The cam track preferably includes at least one cradle that receives the cam when the bolster is in a fully upright position where it can be sat upon by a seat occupant. The cradle preferably is constructed and arranged to retain the bolster in its fully upright position such that inadvertent or unintended movement of the bolster away from the fully upright position is opposed. When in its fully upright position, the bolster preferably is locked in that position and can only be moved away from this position toward its generally horizontal down position by intentional application of manual force.

In one preferred embodiment, the up position cradle is a notch in the cam track that receives and releasably retains part of the end of a bolster arm therein. The cam track preferably includes a second notch or pocket that receives and releasably retains the end of the bolster arm such that the bolster is releasably retained in its generally horizontal down position.

In another preferred embodiment, each cam track is defined by a channel that preferably is integrally formed. The channel includes a pair of spaced apart sidewalls between which the cam travels. Each cradle is a pocket or recess formed of end of the channel.

A guide slot and pin received in the slot also help guide bolster movement between its generally upright position and its generally horizontal down position. Each bolster arm preferably has such a guide slot formed therein that is of elongate construction. The slot preferably is oriented with its lengthwise extent generally parallel to the lengthwise extent of the bolster arm in which it is formed.

A pin is received in each slot with each pin extending outwardly from the side of the base. Each pin preferably also helps keep the bolster movably attached to the base such that it cannot be pulled free of the base during use and operation. Each pin also helps keep the cam in its corresponding cam track further helping to prevent disengagement. Each pin preferably is a fastener that is threadably anchored in the side of the base and has an enlarged head that is larger than the width of the slot in which it is received.

In one preferred embodiment, each side has a plurality of cams and cam tracks with one of the cams received in one of the cam tracks and the other one of the cams received in the other one of the cam tracks. Each cam track preferably is of non-straight construction. Each cam track preferably has at least one curved section. In one preferred embodiment, each cam track has a plurality of curved track sections with one of the cam tracks having a ridge disposed between its ends.

The up position cradle of at least one of the cam tracks of each side preferably positively locks the bolster in its generally upright position. Each such up position cradle defines a generally downwardly extending locking cavity in which one of the cams is received when the bolster is in its generally upright position. Each downwardly extending locking cavity opposes bolster movement toward the generally horizontal down position without the bolster first being manually pulled in an upward direction so as to displace each corresponding cam from its locking cavity. After that, the bolster can be rotated toward its generally horizontal down position with relative ease.

In one preferred embodiment, the inner surface of each shell sidewall has a pair of spaced apart cam tracks integrally formed therein that each receives an outwardly extending cam carried by a bolster arm disposed adjacent the shell sidewall. Each bolster arm has an elongate guide slot through which a guide pin is received that attaches the arm to the inner surface of the adjacent shell sidewall. The cams, their respective cam tracks, the guide slots, and their respective guide pins, cooperate to guide bolster movement between its up and down positions.

The shell preferably is integrally molded of one-piece and unitary construction with the cam tracks integrally molded therewith. The bolster has a frame or skeleton that is molded of one-piece and unitary construction with each cam integrally molded therewith. The bolster skeleton preferably is injection molded, producing a bolster that is strong, yet lightweight. Padding preferably is attached only to the front part of the bolster skeleton that joins the arms thereby facilitating smoother bolster movement between its up and down positions. Each arm is relatively thin in cross section to help facilitate smoother bolster movement.

Where the bolster is used in conjunction with a shell, the inner surface of each shell sidewall preferably is provided with an abutment against which an edge of a corresponding bolster arm bears when the bolster is in the up position. Such an arrangement opposes bolster movement beyond the up position and helps prevent one or both bolster arms from bending when being urged backwardly toward the up position.

It is an object of the invention to provide a seat construction with improved safety, function, comfort and appearance while advantageously reducing production costs.

It is an advantage of the present invention to provide a seat suspension arrangement where components, such as the webbing and any springs, can be replaced or otherwise easily serviced.

It is an advantage of the present invention to provide a seat suspension arrangement of multi-stage construction whose load-deflection characteristics can be tailored for a wide variety of applications, including for marine and off-road vehicle applications.

It is an advantage that a bolster arrangement made in accordance with the invention is provided with a positive lock in the up position that keeps it in the up position.

It is an advantage that a bolster arrangement made in accordance with the invention moves more freely between its up and down positions once disengaged from being locked in the up position.

It is an advantage of the present invention to provide a bolster arrangement that also can be quickly, easily and inexpensively assembled.

It is an advantage of the present invention to provide a bolster arrangement that also can be quickly and easily disassembled for servicing.

It is an advantage of the present invention to provide a shell that can be quickly and inexpensively made by rotocasting or blow molding.

It is an advantage of the present invention to provide a bolster that can be quickly and inexpensively made by injection molding.

Other objects, features and advantages of the present invention include one or more of the following: providing a vehicle seat suspension that is well suited for absorbing the frequency of bumps and shocks typically encountered in marine applications, providing a vehicle seat suspension that is adaptable to many different seating configurations, providing a seat suspension that can be used with or without a seat cushion, providing a seat suspension that is water resistant; and providing a seat suspension that is of simple construction, economical to make, easier and faster to assemble, easier to service, is more versatile and adaptable, and which is durable, robust and reliable.

Other objects, features and advantages of the present invention include one or more of the following: providing a bolster arrangement that is safer and easier to use; providing a bolster arrangement that can be used with or without a seat shell; providing a bolster arrangement that is strong, suitably stiff, that can support at least part of a load of a seat occupant whether in the up or down position; and providing a bolster arrangement that is of simple construction, economical to make, easier and faster to assemble, easier to service, is more versatile and adaptable, and which is durable, robust and reliable.

Other objects, features, and advantages of the present invention will become apparent to those skilled in the art from the detailed description and the accompanying drawings. It should be understood, however, that the detailed description and accompanying drawings, while indicating at least one preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

These and other objects, features, and advantages of this invention will become apparent from the following detailed description of the best mode, appended claims and accompanying drawings in which:

FIG. 20 is a fragmentary side elevation view of the bolster of FIGS. 18 and 19 depicting bolster motion between its up and down positions;

FIG. 21 is a simplified motion diagram depicting motion of the bolster of FIG. 20 between its up and down positions;

DETAILED DESCRIPTION OF AT LEAST ONE PREFERRED EMBODIMENT

Figure 1:
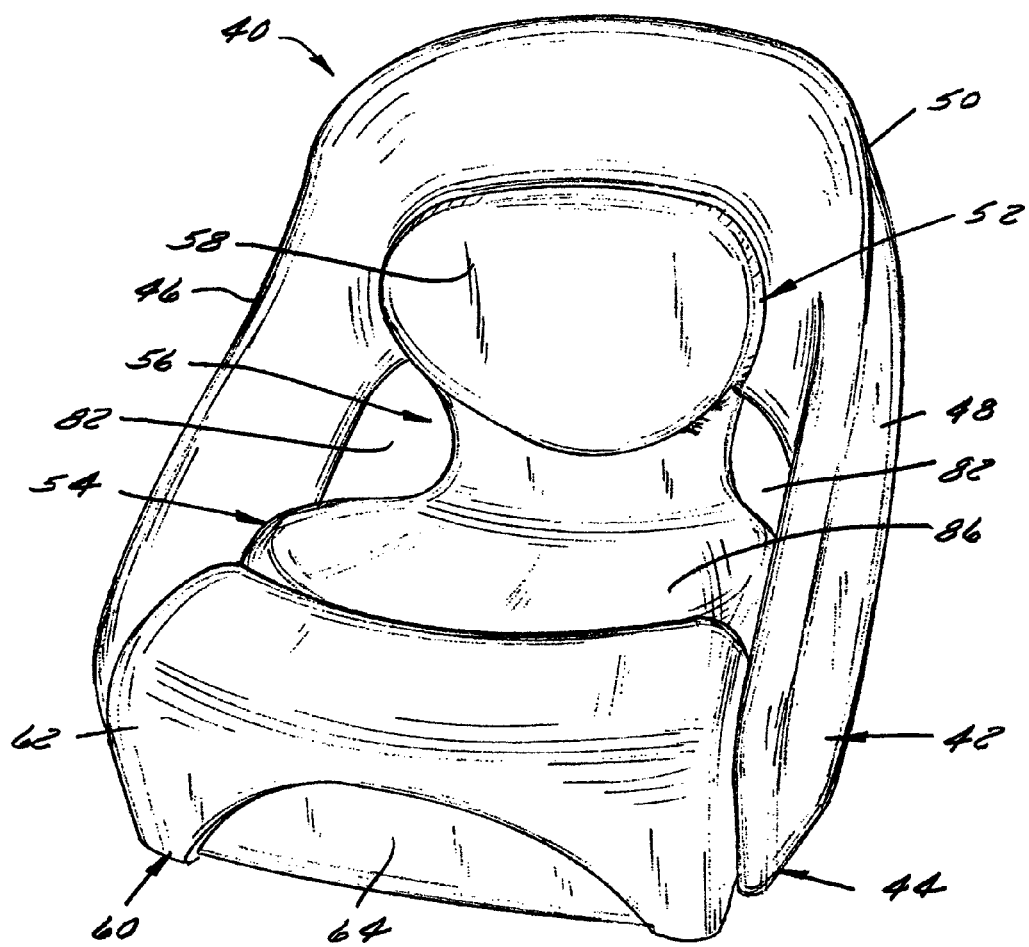
FIG. 1 is a front perspective view of one preferred embodiment of a seat, bolster and bucket seat shell of the invention.

FIG. 1 illustrates one preferred embodiment of a seat, bolster and shell assembly 40 that is well suited, for example, for use in marine seating applications as well as other off-road vehicle seating applications. The shell 42 includes a base 44, a pair of sidewalls 46, 48 that extend generally upwardly from the base 44, and a back wall 50 that extends between the sidewalls 46, 48 and curls around the backside of a seat occupant (not shown). The seat 52 is removably received in the shell 42 and supported by the shell 42. The seat 52 has a cushion 54, a necked down portion 56, and a seat back 58 that supports one of the upper and lower lumbar portion of the back of a seat occupant. The bolster 60 is shown in a down position with its seat cushion surface 62 disposed forwardly of the cushion 54 of the seat 52. The bolster 60 has a second seat occupant supporting surface 64 that is shown in a forwardly facing position. When needed, the bolster 60 can be moved from its down position to an upright position where its seat occupant supporting surface 64 faces upwardly and overlies a portion of the cushion 54 of the seat 52 to enable a seat occupant to sit higher up.

Figure 2:
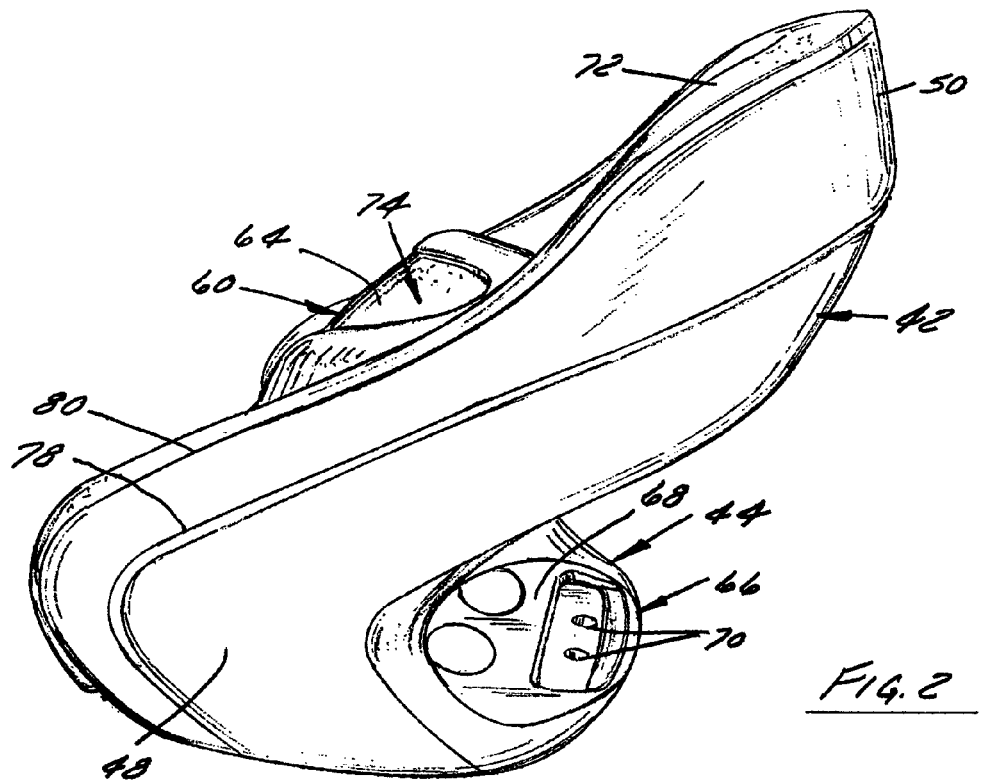
FIG. 2 is a side perspective view of the arrangement depicted in FIG. 1.

FIG. 2 illustrates another preferred embodiment of a shell 42 and bolster 60 with the bolster 60 located in an upright position. The seat 52 has been removed thereby exposing part of the shell base 44 and its seat mounting arrangement 66. The seat mounting arrangement 66 preferably includes a mounting platform 68 that carries at least two or more spaced-apart mounts 70, each of which preferably is a fastener hole through which a fastener (not shown) can extend and engage a seat mounted to the shell 42. If desired, each hole can accommodate a threaded nut, a threaded bolt, or the like, either of which preferably is fixed to the shell 42.

Figure 5:
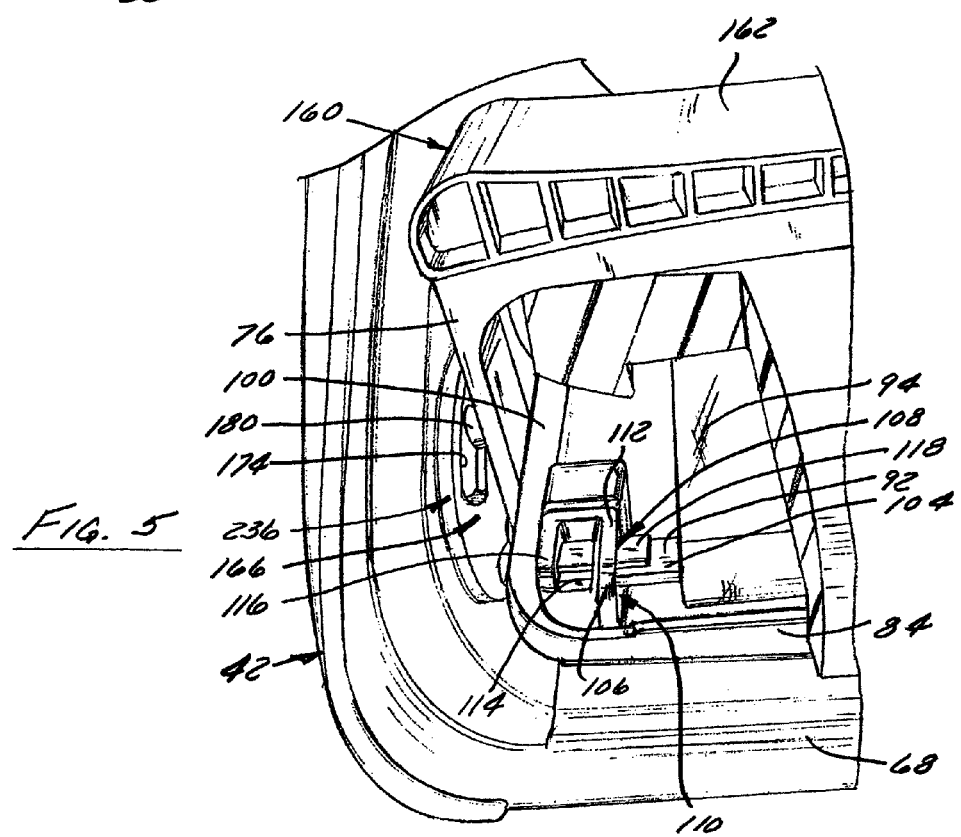
FIG. 5 is an enlarged fragmentary perspective view of the seat of FIG. 4 disposed in a shell equipped with a flip-up type bolster.

The shell 42 and bolster 60 can each respectively have a layer of padding 72 and 74 over which a respective covering (not shown) is applied. The padding 72 and 74 can be made of foam, such as an open cell or closed cell foam, or the like. The covering can be made of leather, nylon, vinyl, or another suitable covering material. In one preferred embodiment, the bolster 60 has a pair of arms 76, only one of which is shown in FIG. 5, of solid construction and lacks any padding or covering on them. Such a bolster arm 76 arrangement preferably results in smoother, easier bolster movement during use and operation.

The shell 42 preferably is made of a synthetic material that preferably is plastic or the like. The shell 42 is preferably made using a molding method. One particularly preferred molding method is a rotocast molding method. One preferred rotocast molding material is polyethylene, such as linear low density polyethylene or medium density polyethylene. If desired, the shell 42 can also be blow molded.

In one preferred method, a parting line of the mold used to make the shell is located along a majority of the length of at least one of the styling lines 78 of the shell 42. Preferably, this also is the case for each armrest styling line 80. The result is an upraised edge that helps accentuate the angular styling of the shell 42 while simulating a seam in the covering when the covering is applied.

Figure 3:
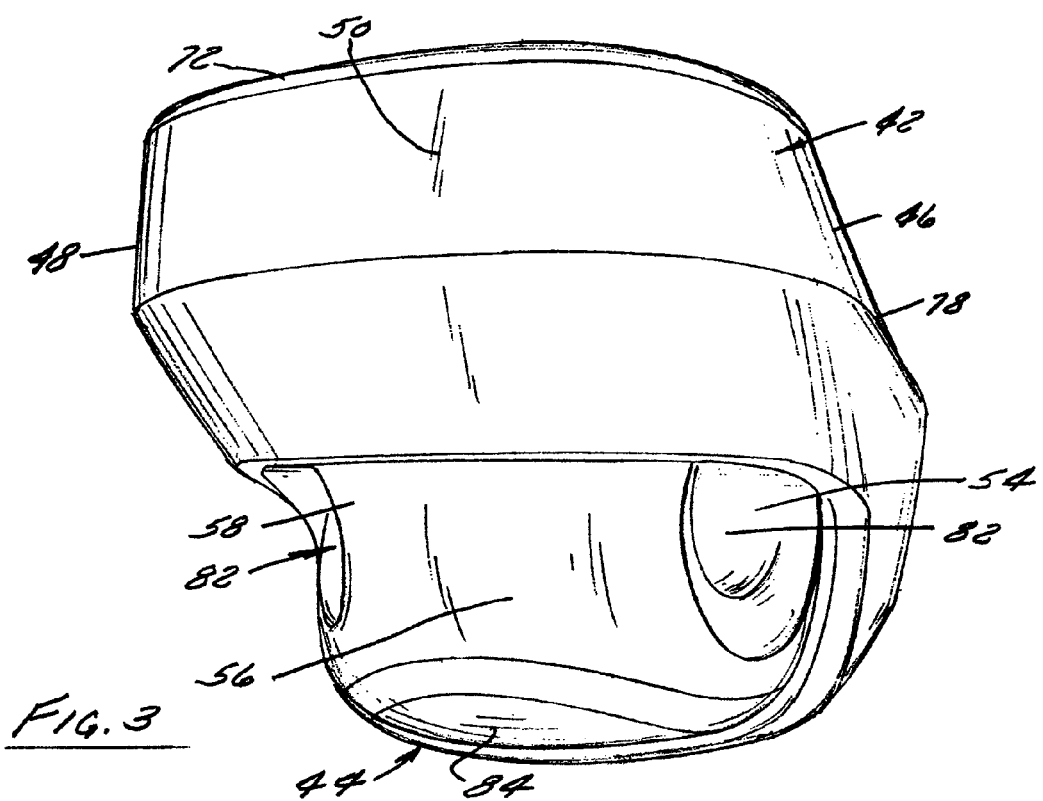
FIG. 3 is a rear perspective view of the arrangement depicted in FIG. 1.

FIG. 3 illustrates the rear of the shell 42 and seat 52 in more detail. The back wall 50 of the shell 42 extends between the sidewalls 46, 48 and is spaced from the base 44, defining a rear window 82 between the back wall 50 and the base 44. Part of the seat 52 is visible through the window 82 when the seat 52 is assembled. As is shown in FIG. 3, the seat back or backrest 58 is supported by the back wall 50 of the shell 42, helping to strengthen and stiffen it. The seat cushion 54 is carried by a seat base 84 that is anchored to the shell base 44, fixing it to the base 44. As a result, the seat 52 and shell 42 collectively form an assembly that is easy to take apart and service, but which is aesthetically pleasing, robust, resilient, strong, durable, reliable, elegant, long-lasting, and economical to make and use.

Figure 4:
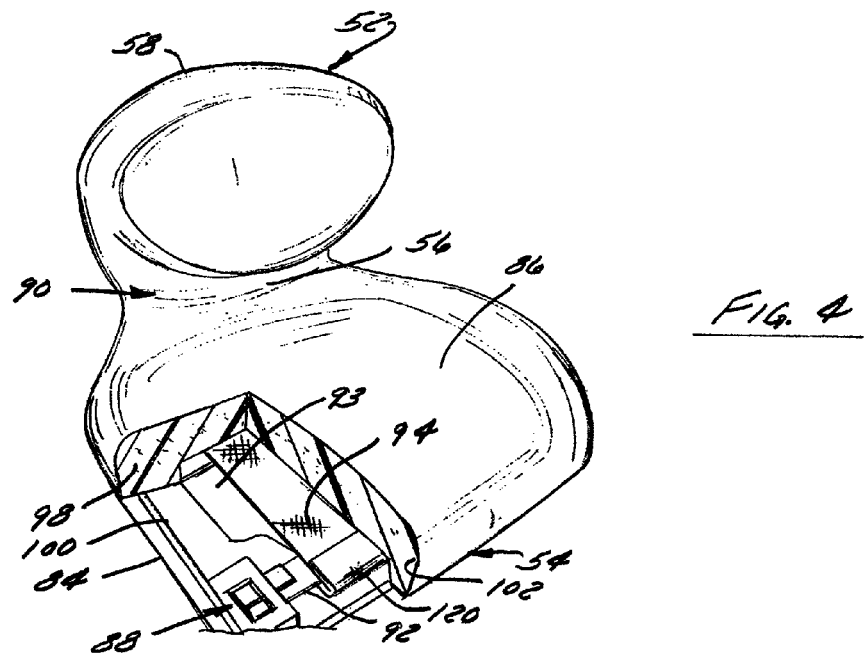
FIG. 4 is a fragmentary front perspective view of a seat with part of its seat cushion broken away to reveal a portion of a seat suspension of the invention.

Referring additionally to FIG. 4, the seat cushion 54 has an hourglass frontal profile with the backrest cushion 58 being the upper half, a buttocks supporting seat cushion 86 being the lower half, and a diametrically necked down neck cushion portion 56 joining the backrest cushion 58 to the buttocks supporting seat cushion 86. The seat cushion 54 preferably is of one-piece unitary construction, overlies a seat suspension 88, and is supported on the seat base 84. In the preferred seat embodiment shown in FIG. 4, the seat cushion 54 is comprised of a resilient, flexible seat occupant supporting material that preferably provides at least some cushioning and dampening of bumps, jolts, shocks, and vibration. Preferably, the seat cushion 54 is made of an open cell or closed cell foam and can be constructed such that an exterior of the cushion includes a skin of non-porous construction so as to repel water and other liquids.

In the preferred embodiment shown in FIG. 4, the seat back 58 comprises a cushion that has an oval shape with a transverse cross sectional width that is narrower than that of the buttocks supporting seat cushion 86. The seat back cushion 58 narrows at the neck 56 with the juncture between the neck 56 and buttocks supporting seat cushion 86 providing a drainage channel 90 that is contoured so as to encourage rapid draining of liquid from the seat occupant supporting exterior surfaces of the buttocks supporting seat cushion 86 and backrest cushion 58.

Referring additionally to FIGS. 5-7 and 11, the seat 52 preferably also includes a seat suspension 88. In the preferred embodiment shown in FIGS. 4 and 5, the seat suspension 88 underlies the buttocks supporting seat cushion 86 to help support the weight of a seat occupant under a wide variety of operating conditions. The suspension 88 includes at least one spring 92 that carries webbing 94 which extends from the spring 92 rearwardly toward the rear of the seat base 84, which underlies the webbing. In a currently preferred embodiment, the webbing 94 extends from a rear spring 96 (FIG. 6) to the front spring 92, interconnecting the two springs 92 and 96.

The buttocks supporting seat cushion 86 has a downwardly extending leg 98 about its periphery that defines a recess 93 (FIG. 4) in the middle of it underside that helps accommodate the webbing 94 and each spring 92 and/or 96. Each downwardly extending leg 98 rests upon a platform surface 100 of the seat base 84. Preferably, each leg portion 98 is fixed to the platform surface 100, such as by an adhesive, a fastener, or the like. The front leg of the seat cushion preferably forms an overhang 102 that can be unsupported by the seat base 84.

Each spring 92 and 96 preferably comprises an elongate beam spring 104 that extends transversely from one side of the seat base 84 to the other side of the base 84. In the preferred embodiment shown in FIGS. 4-7, each end of the beam spring 104 is received in a retainer 106 of the base 84. The retainer 106 includes a spring-receiving slot 108 that defines part of a stirrup 110 that preferably includes an integrally molded latch bar 112, land 114, and stop 116. The land 114 underlies part of the end of the spring 104, the latch bar 112 overlies the land 114 and part of the spring 104 and the stop 116 is an upraised part of the base 84 located at one end of the spring 104 that limits longitudinal spring motion. To help accommodate some movement of the spring 104 relative to the retainer 106, at least part of a side edge of the spring can be received in a bearing 118 that preferably comprises a clip that extends along part of a top surface of the spring 104, thereby also spacing the spring 104 from the latch bar 112, that extends along the spring side edge between it and the retainer 106, and that extends along part of a bottom surface of the spring 104, thereby also spacing the spring 104 from the land 114. The result is a spring retainer arrangement of simple, yet elegant construction that provides just enough play to permit easy insertion and withdrawal of the spring 104 while securely supporting the spring 104 once it is received in the retainer 106.

The webbing 94 is carried by each spring 92 and/or 96 and extends substantially the length of that part of each spring which is unsupported by any retainer arrangement 106. The webbing 94 is configured with a sleeve 120 (FIG. 4) or clip 122 (FIGS. 6 and 11) that receives part of the spring such that the webbing 94 is securely retained on each spring during operation. In one preferred embodiment, the webbing 94 is folded over and stitched to provide a spring-receiving sleeve 120 (FIG. 4). In another preferred embodiment, a clip 122, such as a nylon J-channel or U-channel, is attached to the webbing 94, such as by sewing, and is clipped onto the spring such that it extends around at least part of the spring top surface, the spring outer edge, and at least part of the spring bottom surface to securely mount the webbing 94 to the spring.

The webbing 94 is assembled such that it is pretensioned to help support a load (approximated in FIG. 7 as a downward force), such as the weight of a seat occupant, which is placed on the seat. In one preferred embodiment, the length of the webbing 94 is selected so as to impart at least a slight pretension to the webbing 94 when attached to the front spring 92 and the rear spring 96, or a mounting post 124 (FIG. 12) when only one spring is used. For example, in one preferred embodiment, the webbing 94 is pretensioned such that it is elongated at least two percent without any load present and does not exceed fifteen percent elongation when under load during use and operation. The spring mounting arrangement, the distance between the springs, and the length of webbing 94 are all selected with pretensioning in mind. The result is a tautly mounted webbing 94 that serves as a seat suspension member that helps cushion a seat occupant from bumps, jolts, shocks and vibration and which acts in concert with each spring 92 and/or 96 in doing so.

The webbing 94 preferably is made of a fabric 126 that preferably is comprised of a mesh or a mesh-like structure. In one preferred embodiment, a load bearing fabric 126 is used that preferably includes elastomeric filaments woven into the fabric 126. For example, in a currently preferred embodiment, the load bearing fabric 126 includes high strength elastomeric filament woven together with polyester yarn, such as DACRON, with the filament running crosswise to the yarn. One such suitable and commercially available load bearing fabric 126 is a DYMETROL load bearing fabric available from Acme Mills of Detroit, Mich. Other suitable fabrics include PELLICE fabric available from Quantum, Inc., of Colfax, N.C., FLEXNET fabric available from Milliken of Spartanburg, S.C., and COLLAGE fabric available from Matrix of Greensboro, N.C.

Each beam spring 104 preferably is made of a composite material, such as a glass filled nylon with fibers unidirectionally oriented, another type of unidirectionally oriented fiber composite, or another suitable composite material. If desired, each beam spring 104 can be made of steel, such as spring steel or the like, a carbon fiber composite, an aramid fiber, such as KEVLAR, or another suitable material. Each beam spring 104 is made of at least one leaf that is generally rectangular or oblong in shape and which has a generally rectangular or oblong cross section. As is depicted in the various drawing figures, each beam spring 104 has a pair of outer ends, a pair of side edges, a top or upper surface, and a bottom or lower surface. While each beam spring 104 can be cantilevered from part of the seat base 84, it preferably is supported at each end by part of the base 84.

Each spring 104 preferably has a spring constant of at least 35 pounds per inch of deflection. Where front and rear springs 92 and 96 are used, the rear spring 96 preferably has a spring constant greater than that of the front spring 92. In one preferred embodiment, each spring has a spring rate of at least 42 pounds per inch of deflection. In one preferred implementation, the front spring 92 is longer than the rear spring 96 such that the rear spring 96 is less compliant than the front spring 92. When combined with the buttocks supporting seat cushion 86, the use of a more compliant front spring 92 provides better thigh support and greater thigh comfort.

In one preferred embodiment, front and rear springs 92 and 96 are used with the front spring 92 and its bearings 118 having a first stage of initial deflection with a first spring rate and a second stage of deflection with a second spring rate that is different than the first spring rate. Likewise, the rear spring 96 and its bearings 118 have a first stage of deflection with a first spring rate and a second stage of deflection with a second spring rate that is different than the first spring rate. In one preferred exemplary embodiment, the front spring 92 and its bearings 118 provide an effective spring rate of about 46.0 pounds per inch of deflection from about 0.3 inches of deflection to about 0.8 inches of deflection and an effective spring rate of about 42.0 pounds per inch of deflection from about 0.8 inches of deflection to about 1.3 inches of deflection. The rear spring 96 and its bearings 118 provide an effective spring rate of about 55.6 pounds per inch of deflection from about 0.3 inches of deflection to about 0.8 inches of deflection and an effective spring rate of about 43.4 pounds per inch of deflection from about 0.8 inches of deflection to about 1.3 inches of deflection.

The result preferably is a three stage shock absorbing seating system that conforms to a seated user by bending side to side and by stretching front to back. One stage of the seating system comprises the load bearing fabric 126, which stretches in a front to back direction when a downward force is applied. Another stage of the seating system comprises the rear spring 96 that deflects in response to a higher downward applied force due to its higher spring rate. A still further stage of the seating system comprises the front spring 92 that deflects in response to a lesser downward applied force than what causes the rear spring 96 to deflect. In one preferred embodiment, the load bearing fabric 126 deflects in response to low applied downward forces, the front spring 92 deflects in response to medium applied downward forces, and the shorter rear spring 96 deflects in response to higher applied downward forces.

Each end of each spring 92 and 96 preferably is received in one such bearing 118 that is located between the spring and the retainer 106 of the seat base 84. In one preferred embodiment, such as is depicted in FIG. 5, a single generally U-shaped bearing clip 118 is located between the side, top and bottom surfaces of each spring end. In a currently preferred embodiment, a pair of such bearing clips 118 is used with one bearing clip 118 being disposed along one side edge of the spring end and the other bearing clip disposed along the other side edge of the same spring end. In still another preferred embodiment, the bearing can be of tubular construction (not shown) that fits over a portion of a spring end like a sleeve or cap.

As previously mentioned, the buttocks supporting seat cushion 86 can be made with a front edge overhang 102 such that the front edge of the cushion 86 does not bear against any part of the seat base 84 when the seat 52 is in an unloaded condition (e.g., without any seat occupant). Such an arrangement accommodates deflection of the cushion 86 during use and operation. Such an arrangement also helps increase the amount of thigh supporting surface area of the cushion 86 that gets transmitted to the front spring 92 during use and operation. One result is that the force of the front spring 92 opposing deflection is spread out over a greater surface area of the cushion 86, which increases thigh comfort and provides more uniform support.

Figure 6:
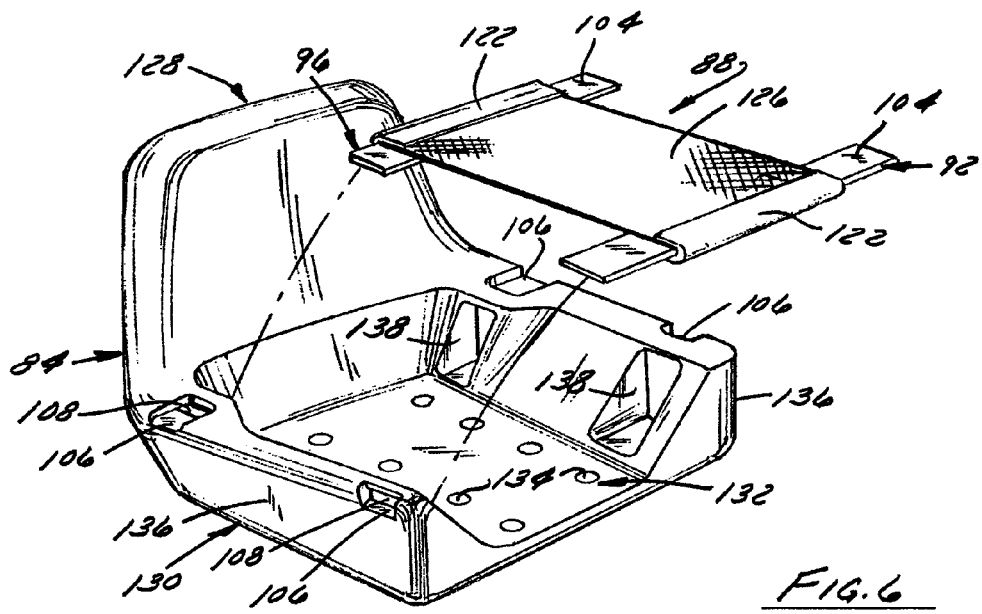
FIG. 6 is an exploded perspective view of a preferred embodiment of a seat suspension and seat pan.
Figure 7:
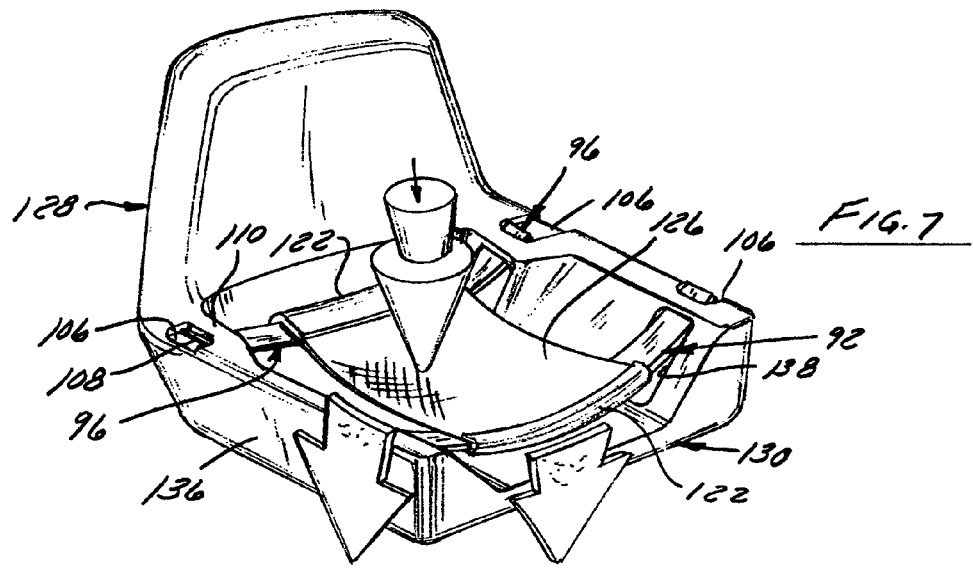
FIG. 7 is a perspective view of the seat pan and suspension system of FIG. 6 illustrating a downward force being applied.

FIGS. 6 and 7 illustrate the seat base 84 in additional detail. The base 84 preferably is of one-piece unitary and homogenous construction. The base 84 preferably is a blow molded or injection molded seat pan or seat support platform that is made of plastic. One suitable plastic is a polyethylene, such as preferably medium density polyethylene. High density polyethylene or polypropylene can also be used.

If desired, the seat base 84 can be equipped with an upraised backrest section 128 that functions as a lumbar support. Where equipped with such a lumbar support 128, it preferably overlaps at least a portion of the back wall 50 of the shell 42. Where the seat base 84 is used without any shell 42, the lumbar support section 128 of the base 84 can be made higher.

The lumbar support section 128 extends upwardly from a seat pan 130 that is equipped with a mounting arrangement 132 along its bottom that is constructed and arranged to facilitate mounting of the seat base 84 to another object, such as the shell 42 or a chassis of a vehicle (not shown). The mounting arrangement 132 preferably includes a plurality of pairs of spaced apart mounts 134, each of which preferably comprises a bore, a fastener, or the like. In the preferred embodiment shown in FIGS. 6 and 7, the mounting arrangement includes a plurality of pairs of through holes 134 that each are constructed and arranged to permit insertion of a bolt (not shown) or other type of fastener (not shown) therethrough. Where bolts are used, each bolt is received in a complementarily threaded nut that is fixed to a vehicle chassis or anchored to a shell.

Figure 10:
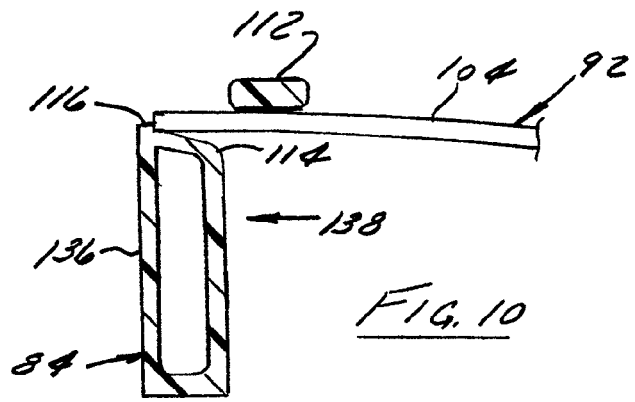
FIG. 10 is a fragmentary cross-sectional view of part of the seat pan and suspension arrangement after assembly has been completed.
Figure 9:
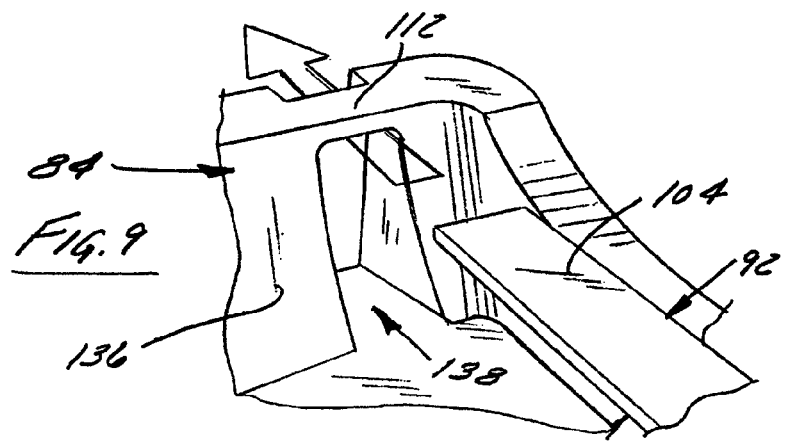
FIG. 9 is an inboard exploded fragmentary view illustrating the seat pan and the beam spring being assembled to the pan.

Extending upwardly along each side of the pan 130 is a pair of spaced apart sidewalls 136. Each sidewall 136 is equipped with at least one spring retaining arrangement that includes a spring retainer 106 constructed and arranged to receive and retain one end of a beam spring 104 therein. Preferably, each sidewall 136 is equipped with a pair of spaced apart spring retainers 106 with one of the retainers 106 located in front of the other one of the retainers 106 in the manner depicted in FIGS. 6 and 7. As is best shown in FIG. 6, to accommodate deflection of each spring 104, each spring retainer 106 is located adjacent a spring clearance recess 138 that is molded in the corresponding sidewall 136 of the seat base 84. In the preferred embodiment shown and FIGS. 6 and 7, each spring clearance recess 138 is located adjacent to a corresponding spring retainer 106 so as to substantially underlie part of one end of one of the springs 104. FIGS. 9 and 10 each depict a preferred example of a clearance recess 138 in additional detail.

Figure 8:
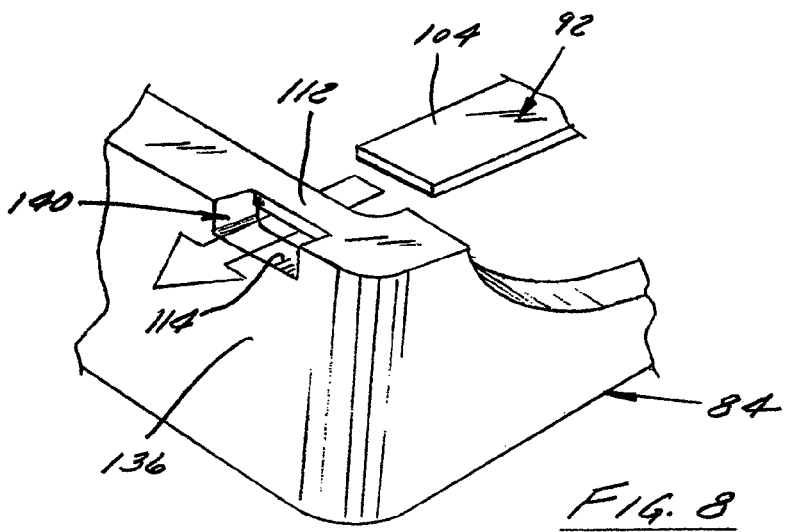
FIG. 8 is an outboard exploded fragmentary view illustrating a seat pan and a beam spring being assembled to the pan.

FIGS. 8-10 illustrate a preferred method of assembling a beam spring 104 to the seat base 84. Referring more particularly to FIGS. 8 and 9, the spring 104 is manipulated to insert one end into a spring retainer pocket 140 (FIG. 8) and underneath its retainer latch bar 112 until the spring end extends beyond the spring stop 116. The end of the spring 104 is extended far enough beyond the stop 116 so that the opposite spring end (not shown) can be lowered until it lies in line with the opposite spring retainer pocket 140 (see e.g., FIG. 6). The spring 104 is then moved back and forth, as needed, and deflected (e.g., bent), to the extent necessary, until each end of the spring 104 is positioned adjacent or against a respective spring stop 116. Depending upon the desired construction and arrangement of the seat suspension 88, the spring 104 may be captured between the spring stops 116 in compression such that it is bowed slightly upwardly or slightly downwardly when it is not under any external load.

FIG. 10 illustrates the beam spring 104 after the spring end has been fully inserted into the spring pocket 140 such that the spring end rests upon part of the spring land 114. To accommodate a first stage of beam spring deflection, the spring land 114 preferably is canted such that it forms an acute included angle between it and the underside of the spring 104 when no external load is being applied to the spring 104. To accommodate a second stage of beam spring deflection, a portion of the beam spring 104 that extends outwardly beyond the inner edge of the spring land 114 can further deflect due to the clearance provided by the spring clearance recess 138.

When assembled to the seat base 84 in the manner generally depicted by FIG. 10, each spring end is releasably captured between the spring retainer latch bar 112, the spring land 114, and the spring stop 116. Such an arrangement advantageously permits servicing of the seat suspension 88 if it becomes necessary to remove one or more springs 92 and/or 96, such as if it becomes necessary to replace one or both springs 92 and/or 96 or the load bearing fabric 126.

In assembling the webbing 94, one of its hook 122 are clipped onto one of the springs 92 or 96 and the other one of its hooks 122 are clipped onto the other one of the springs 92 or 96. Force is applied to stretch the webbing 94 enough so the second hook 122 can be clipped onto its corresponding spring. When finished, each hook 122 remains releasably retained on its respective spring 92 and 96.

In a currently preferred method, the rear hook 122 is clipped onto the rear spring 96 and the webbing 94 is stretched to enable the front hook 122 to thereafter be clipped onto the front spring 92. Although not shown in the drawing figures, after the rear hook 122 is clipped onto the rear spring 96, an elongate rod carried by a pneumatic assembly fixture is slipped through a sewn loop of the webbing 94 that is located along the front edge of the webbing 94. The rod is then driven forwardly relative to the seat base 84 to stretch the webbing 94 enough to enable the front hook 122 to be clipped onto the front spring 92. Thereafter, the rod is withdrawn from the webbing 94. When finished, the webbing 94 preferably remains at least somewhat stretched such that it is pretensioned.

Figure 12:
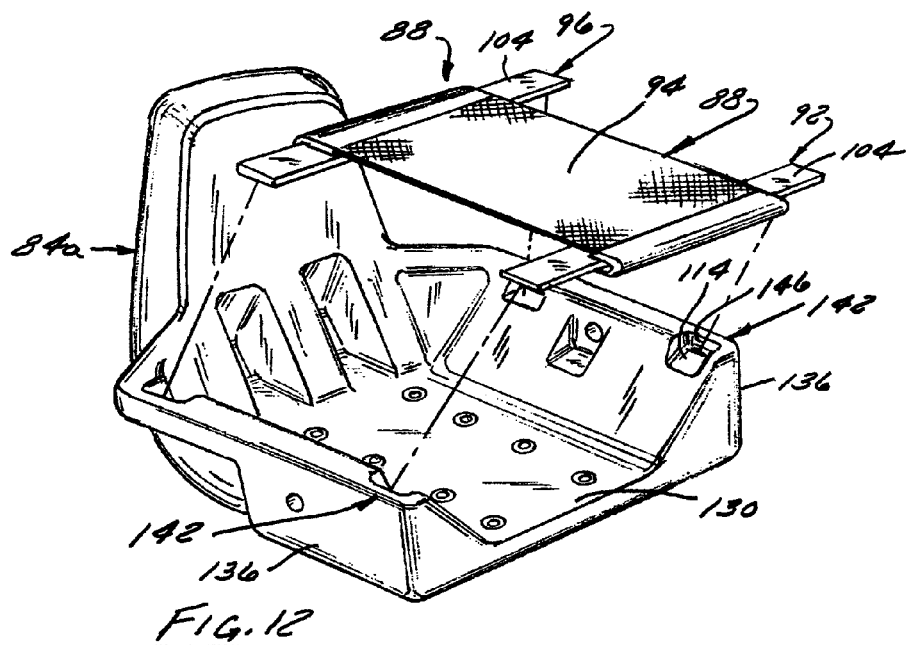
FIG. 12 illustrates an exploded perspective view of another preferred embodiment of a seat pan and beam spring suspension arrangement.
Figure 11:
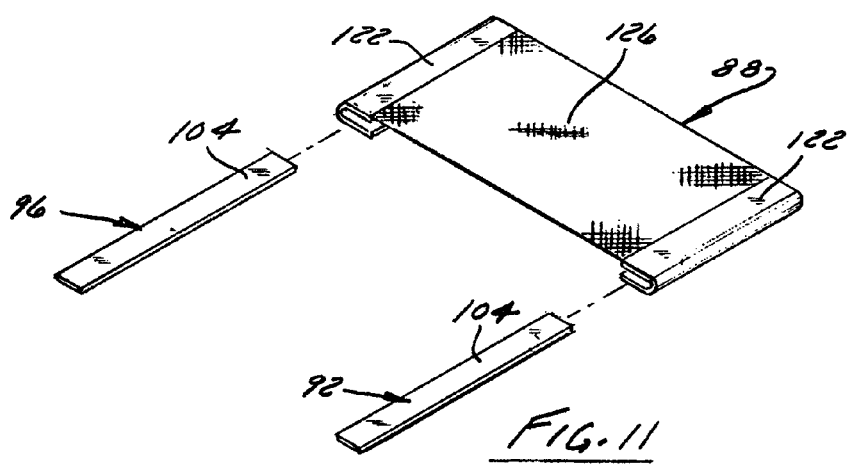
FIG. 11 illustrates an exploded perspective view of a flexible load bearing webbing and pair of beam springs before assembly to the webbing.
Figure 13:
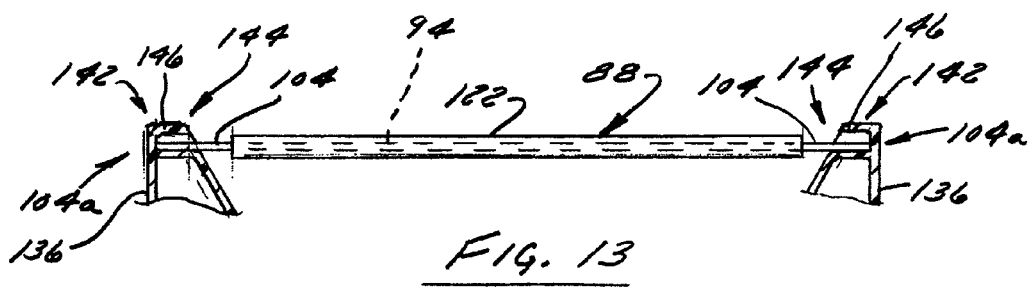
FIG. 13 is a fragmentary transverse cross sectional view depicting a beam spring disposed in its corresponding spring retainers of the seat pan shown in FIG. 12.

FIGS. 12 and 13 illustrate another preferred embodiment of a seat base 84*a* and suspension arrangement 88. This preferred embodiment is similar to that previously discussed but differs because each spring 92 and 96 is received in a retainer 104*a* that is a spring locking arrangement 142 that receives and retains one end of a beam spring 104 without using a pocket that extends completely through the sidewall 136 of the seat support platform. Although not shown in detail, each spring locking arrangement 142 comprises a spring receiving pocket 144 that terminates before reaching an outer surface of the seat support platform sidewall 136 such that it does not extend completely through the sidewall 136. Each spring locking arrangement further comprises an inwardly extending retainer tab or retainer finger 146 that overlies at least a portion of the end of the spring that is inserted into the pocket 144. When one end of a particular spring 92 and/or 96 is inserted into its corresponding spring locking arrangement 142, the spring end is received between the spring land 114 (FIG. 12) and the spring retainer tab or finger 146 (FIG. 13). When both ends of a particular spring 92 and/or 96 are inserted into each of their corresponding spring locking arrangements 142, the spring preferably is captured at least slightly in compression.

Figure 14:
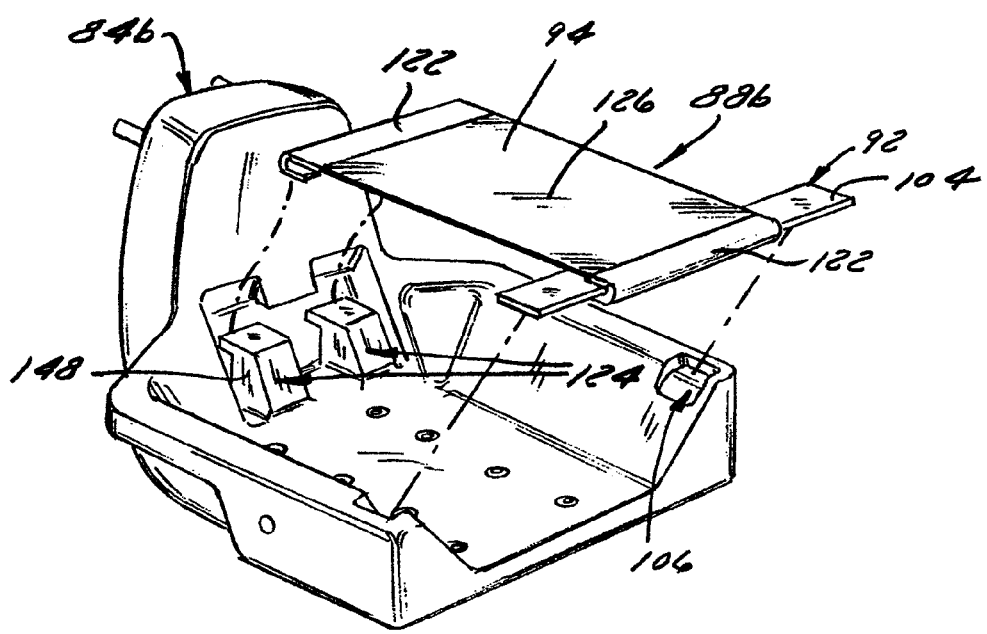
FIG. 14 is an exploded front perspective view of a third preferred embodiment of a seat pan and suspension arrangement that uses only a single beam spring.
Figure 15:
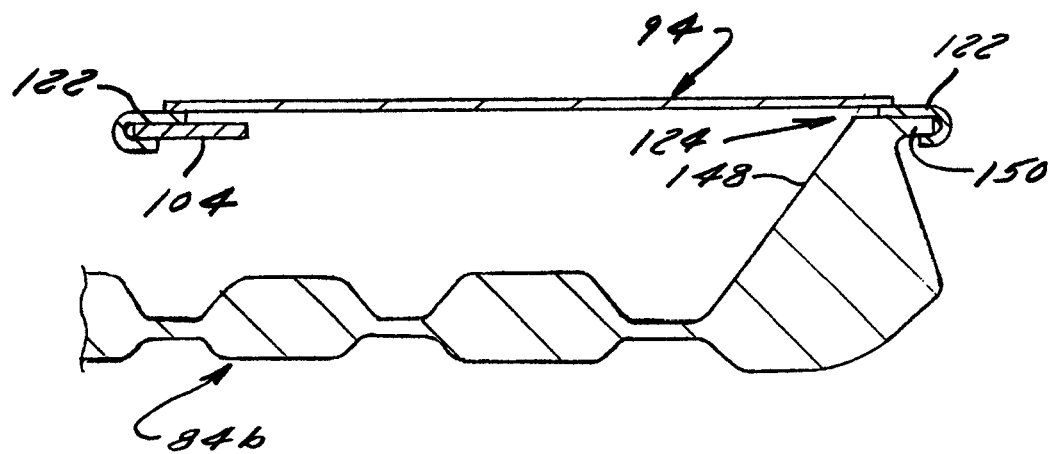
FIG. 15 is a cross-sectional view of the seat pan and suspension arrangement shown in FIG. 14.

FIGS. 14 and 15 illustrate a still further preferred embodiment of a seat base 84*b* and suspension arrangement 88*b* that utilizes only a single beam spring 104 that preferably is forwardly located. The seat base 84b has an integrally formed rear suspension support 148 that is made up of a plurality of transversely spaced apart hook mounting posts 124 that each receive and releasably retain a portion of a clip or hook 122 that is fixed to part of the load bearing fabric 126. In the preferred embodiment shown in FIGS. 14 and 15, each post 124 has a rearwardly facing hook engaging lip 150 that receives and retains part of the hook 122 thereon in the manner depicted in FIG. 13. If desired, a plurality of pairs (i.e., at least three) hook mounting posts 124 can be used. In assembly, the sole beam spring 104 is mounted in its corresponding spring retainers 106, the load bearing fabric 126 stretched taut, and the rear hook 122 is urged into engagement with each one of the hook engaging lips 150.

Figure 16:
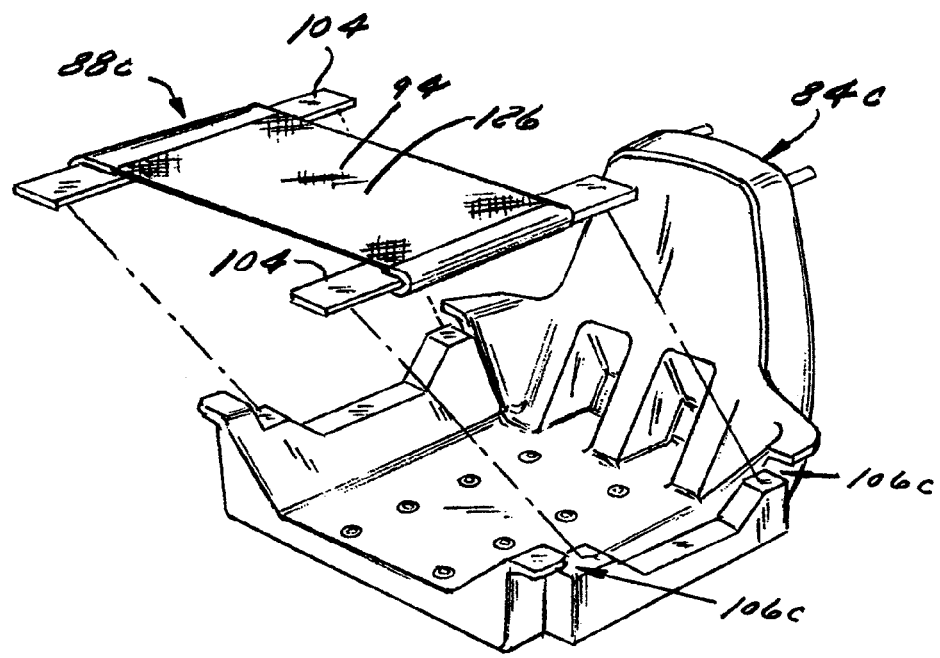
FIG. 16 illustrates an exploded perspective view of a fourth preferred embodiment of a seat pan and suspension arrangement that arranges a pair of beam springs in a fore-aft direction.

FIG. 16 illustrates still another preferred embodiment of a seat base 84c and suspension arrangement 88 that orients the pair of spaced apart beam springs 104 in a fore-aft direction. Each beam spring 104 is carried by one of the sidewalls 136c of the base 84c. Each sidewall 136c includes a pair of spring retainers 106c with one of the retainers 106c located adjacent the front end of the base 84c and the other one of the retainers 106c located adjacent the rear end of the base 84c. Each sidewall 136c has a drop-down clearance recess 152 that is constructed and arranged to accommodate spring deflection during operation.

Figure 17:
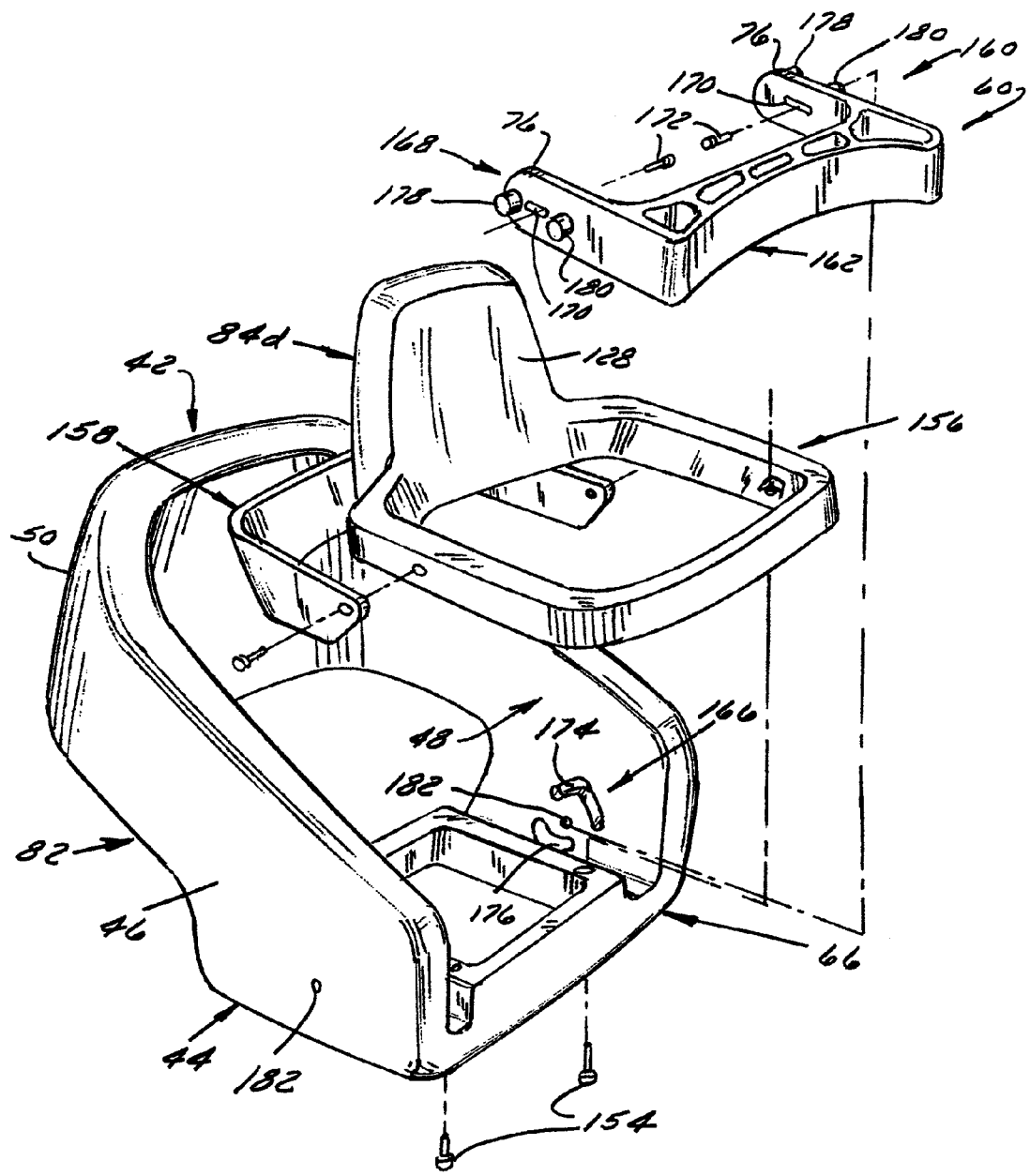
FIG. 17 is an exploded perspective view of another preferred embodiment of a bolster, seat pan, and shell.

FIG. 17 illustrates an exploded perspective view of one preferred embodiment of a shell arrangement 42, a seat base 84d, and a bolster 60. The shell 42 includes a base 44, a pair of upwardly sloping sidewalls 46 and 48, and a wraparound rear wall 50 that defines a rearward opening 82 through which a portion of a seat (not shown in FIG. 17) can be viewed. The shell 42 comprises a molded core that preferably includes some padding and an outer covering. The base 44 of the shell 42 includes a mounting arrangement 66 for receiving at least a plurality of pairs of fasteners 154 or the like that are used to attach a seat, including its base 84d, to the shell 42.

The base 84d preferably is molded from plastic or the like. In the preferred embodiment shown in FIG. 15, the base 84d comprises an injection molded or blow molded ring 156 from which extends an upstanding backrest support 128. If desired, the base 84d can be equipped with a pivotally attached back closure 158 that preferably is of molded construction. If desired, the base 84d can be made with a bottom wall (not shown) that overlies or encircles all or part of the ring 156. The ring 156 is attached to the shell 42 preferably using fasteners 154 or another means of attachment.

The bolster 60 is shown in FIG. 17 without any foam padding or its outer covering. The bolster 60 includes a bolster skeleton 160 that functions as the bolster frame. The bolster 60 includes a transversely extending outer support brace 162 from which a pair of arms 76 rearwardly extends. While the brace 162 preferably is hollow, such as of honeycomb or ribbed construction, each arm 76 is of unitary and one-piece solid construction. The bolster skeleton 160 preferably is comprised of plastic, such as polyethylene, polypropylene, vinyl, or the like. The skeleton 160 preferably is injection molded of one-piece and unitary construction. The skeleton 160 can be made, for example, of polypropylene or nylon.

To facilitate bolster movement, one of the shell 42, the seat base 84, and the bolster 60 are equipped with a track system 166 and another one of the shell 42, seat base 84, and bolster 60 have a plurality of bosses or cams 168 that engage the track system 166. To help guide movement and help keep the bolster 60 constrained, one of the shell 42, seat base 84, and bolster 60 is equipped with an aperture 170 and another one of the shell 42, seat base 84, and bolster 60 is equipped with a pin 172 that extends through the aperture 170. In a preferred embodiment, each pin 172 comprises a fastener that preferably threadably attaches the bolster 60 to one of the shell 42 and the seat base 84.

In the preferred embodiment shown in FIG. 17, each inner sidewall of the shell 42 includes a plurality of curvilinear spaced apart tracks 174 and 176 formed therein that each receive a cam that is carried by one of the bolster arms 76. Each arm 76 preferably has a plurality of spaced apart cams 178 and 180 that extend outwardly therefrom that are each received in one of the tracks 174 and 176 after assembly is completed. In the preferred embodiment shown in FIG. 15, the aperture 170 comprises an oblong slot through which a fastener 172 extends. In assembly, each guide pin 172 is inserted through its corresponding slot 170 until it engages a retainer, such as a nut, preferably a T-nut, which preferably is fixed to each one of the shell sidewalls 46 and 48. In the preferred embodiment shown in FIG. 17, each nut (not shown) is disposed in a bore 182 in a corresponding shell sidewall 46 and 48. Each nut preferably is integrally molded as part of the shell 42.

Figure 18:
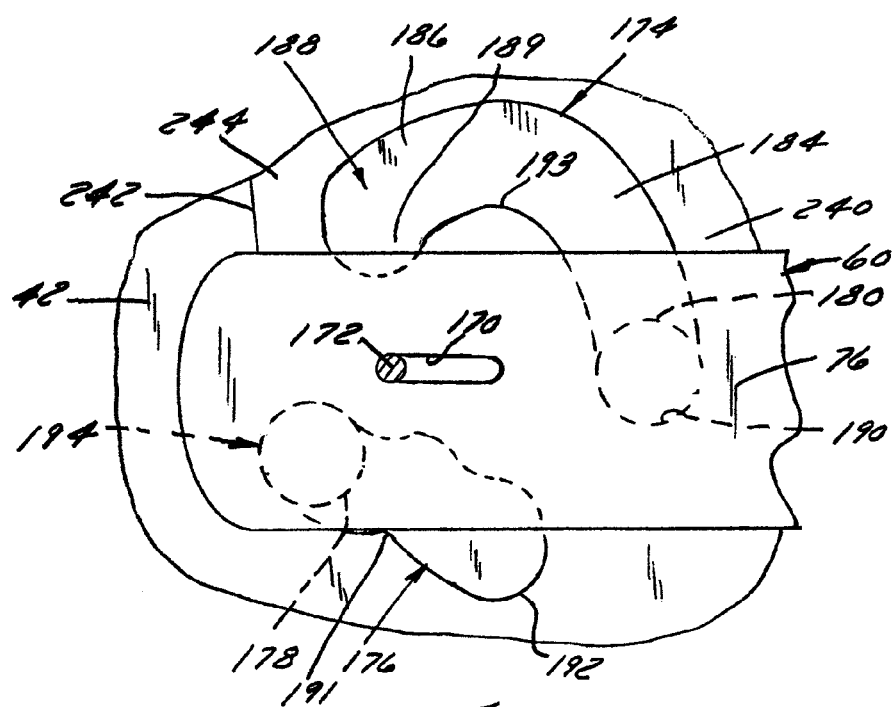
FIG. 18 is an enlarged fragmentary side elevation view depicting one preferred bolster cam and track arrangement with the bolster in a generally horizontal down position.
Figure 19:
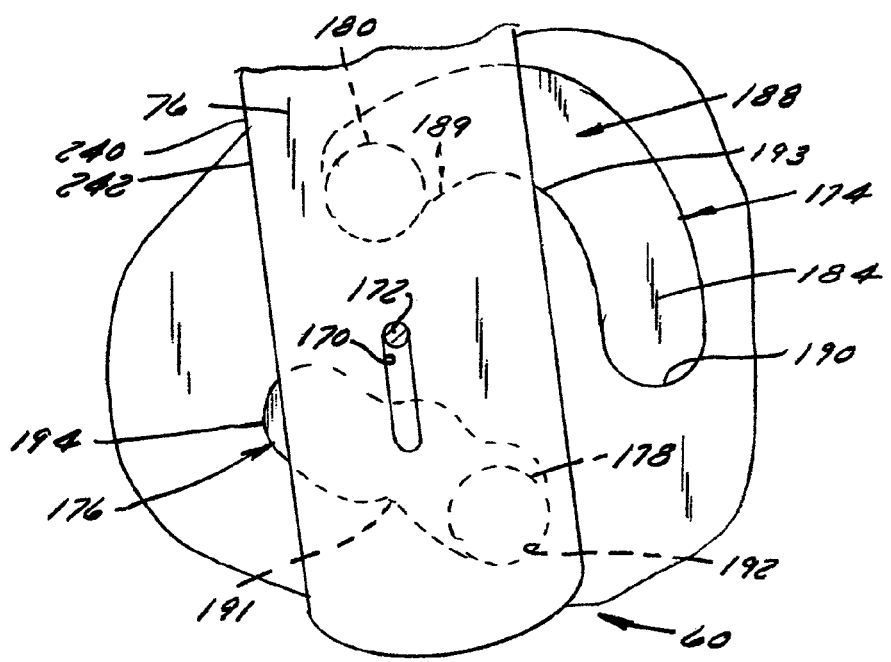
FIG. 19 is an enlarged fragmentary side elevation view depicting the preferred bolster cam and track arrangement of FIG. 18 with the bolster being releasably retained in a generally vertically extending upright position.

FIG. 18 depicts the bolster 60 oriented in a generally horizontal down position. FIG. 19 depicts the bolster 60 oriented in a generally upright position. When in the upright position, the tracks 174 and 176 and cams 178 and 180 preferably cooperate to oppose the bolster 60 from being moved away from the upright position toward the down position. As a result, when in the upright position, the bolster 60 is positively retained in the upright position.

Referring to FIG. 18, when the bolster 60 is in a generally horizontal down position, the front cam 180 is located forwardly of the rear cam 178 with one of the cams located on one side of the guide pin 172 and the other one of the cams located on the other side of the pin 172. When the bolster 60 is located in the generally horizontal down position, the front cam 180 is located at a front end of the upper cam track 174 in which it is movably received and the rear cam 178 is located at a rear end of the lower cam track 176 in which it is movably received. The front end of the track 174 defines a down position cradle 190 in which the cam 180 seats when the bolster 60 is in the down position.

When the bolster 60 is lifted, such as when it is manually grasped and pulled upwardly, the front cam 180 travels upwardly and generally curvilinearly along a first section 184 of its cam track 174 along an arc for approximately the first forty-five degrees of its stroke. At substantially the same time, the rear cam 178 begins moving in its cam track 176 forwardly toward an intermediate position where it is located somewhere between the ends 192 and 194 of the lower cam track 176. End 194 preferably comprises a down position cradle of the lower cam track 176.

As the bolster 60 is further lifted, the upper cam track 174 transitions to a second generally downwardly extending curvilinear track section 186 having a different contour or radius of curvature than the first section 184 such that the front cam 180 ends up traveling in a generally downward direction until it seats in an up position cradle 188 in the track 174 that helps retain the bolster 60 in its fully upright position. At substantially the same time, the rear cam 178 is displaced further downwardly and forwardly, traveling over a ridge 191 formed in the track 176, until it also rests in an up position cradle 192 of the lower cam track 176. The up position cradle 192 is located at the front end of the lower cam track 176.

The up position cradle 188 is located at the rear end of the upper cam track 174 and defines a downwardly inclined locking cavity in which cam 180 is received and releasably retained when the bolster 60 is in the up position. Each generally downwardly extending locking cavity 189 opposes bolster movement toward the generally horizontal down position without the bolster 60 first being manually pulled in an upward direction so as to upwardly displace each corresponding cam 180 from its locking cavity 189. The bolster 60 must be pulled upwardly until each cam 180 clears a generally upwardly extending rounded cam track lobe 193 before each cam 180 will more easily travel forwardly and downwardly along cam track section 184 as the bolster 60 moves toward its down position.

As the bolster 60 is being moved, the guide pin 172 moves along the guide slot 172 of each arm 76. For example, as the bolster 60 is moved from its down position to its up position, each pin 172 slides from one end of the slot 172 in its corresponding arm 76 to the other end of the slot 172 while each arm 76 also pivots about its corresponding pin 172.

When the bolster 60 is disposed in the up position, the top or rear edge 240 of each bolster arm 76 preferably bears against an abutment surface 242 that extends outwardly from the inner surface of the adjacent shell sidewall 46 or 48. The abutment surface 242 preferably is an integrally formed upraised ridge 244 that provides support to the bolster arm 76 to prevent the arm 76 from being bent backward beyond the up position.

When both the front and rear cams 180 and 178 are respectively located in their up position cradle 188 and 192, it takes a great deal more force to displace the bolster 60 from its upright position than it does to begin moving the bolster 60 upwardly away from its generally horizontal down position. To do so, the bolster 60 first must be lifted upwardly to unlock it from the up position cradles 192 and 188 before the bolster 60 can be rotated forwardly toward its down position. This advantageously provides a more stable bolster seating surface 64 (FIGS. 1 and 2) when the bolster 60 is in its upright position.

Referring additionally to FIGS. 20 and 21, FIG. 20 illustrates motion of the bolster 60 between its up and down positions and FIG. 21 depicts a preferred motion diagram of its movement. When the bolster 60 is in a generally horizontal position the front cam 180 (FIGS. 18 and 19) of each arm 76 is located forwardly of the rear cam 178 (FIGS. 18 and 19) with one of the cams located on one side of the guide pin 172 and the other one of the cams located on the other side of the pin 172. When the bolster 60 is in the generally horizontal down position, the front cam 180 is located at a front end of the upper cam track 174 in which it is movably received and the rear cam 178 is located at a rear end of the lower cam track 176 in which it is movably received.

When the bolster 60 is lifted, such as when it is manually grasped and pulled upwardly, the front cam 180 travels curvilinearly in its cam track 174 along a first generally parabolic path 184 for approximately its entire stroke. At substantially the same time, the rear cam 178 begins moving toward an intermediate position where it is located somewhere between each end of the lower cam track 176 in which is received.

As the bolster 60 is lifted further, the front cam 180 begins tracking further along a second generally parabolic path 186 that ends up displacing the cam 180 in a generally downward direction toward the up position cradle 188 of the upper cam track 174. The up position cradle 188 is located at the rear end of the upper track 174. At substantially the same time, the rear cam 178 is displaced further downwardly until it also rests in the up position cradle 192 of the lower cam track 176. The up position cradle 192 is located at the front end of the lower track 176.

FIG. 21 illustrates motion of the bolster arms 76 and the end 224 of the bolster 60 as each arm 76 slides and pivots about a guide pin 172 received in an elongate guide slot 170 the arm. The path traveled by the end 224 of the bolster is identified by reference numeral 226 in FIG. 21. The down bolster position is represented by reference numeral 228 in FIG. 21. As the bolster 60 is lifted, its end 224 travels along an upward portion of a generally parabolic path that is configured to ensure the end 224 of the bolster 60 clears the front edge of the buttocks supporting seat cushion 86. As the bolster 60 is further lifted, the front cam 180 of each arm 76 displaces a greater extent along its cam track 174 than the rear cam 178 does along its track 176 until the bolster 60 reaches a first intermediate position 230. As the bolster 60 reaches a second intermediate position 232, the end of the bolster begins displacing toward the seat as much as it is displacing generally upwardly.

Further movement of the bolster 60 causes it to reach its upright position 234, a position that enables a seat occupant to sit on the bolster 60. When both the front and rear cams 180 and 178 of each bolster arm 76 are respectively located in their up position cradle 188 and 192, it takes a great deal force to displace the bolster 60 from its upright position helping to lock it in the upright position. This advantageously provides a more stable bolster seating surface 64 when the bolster 60 is in its upright position.

Figure 22:
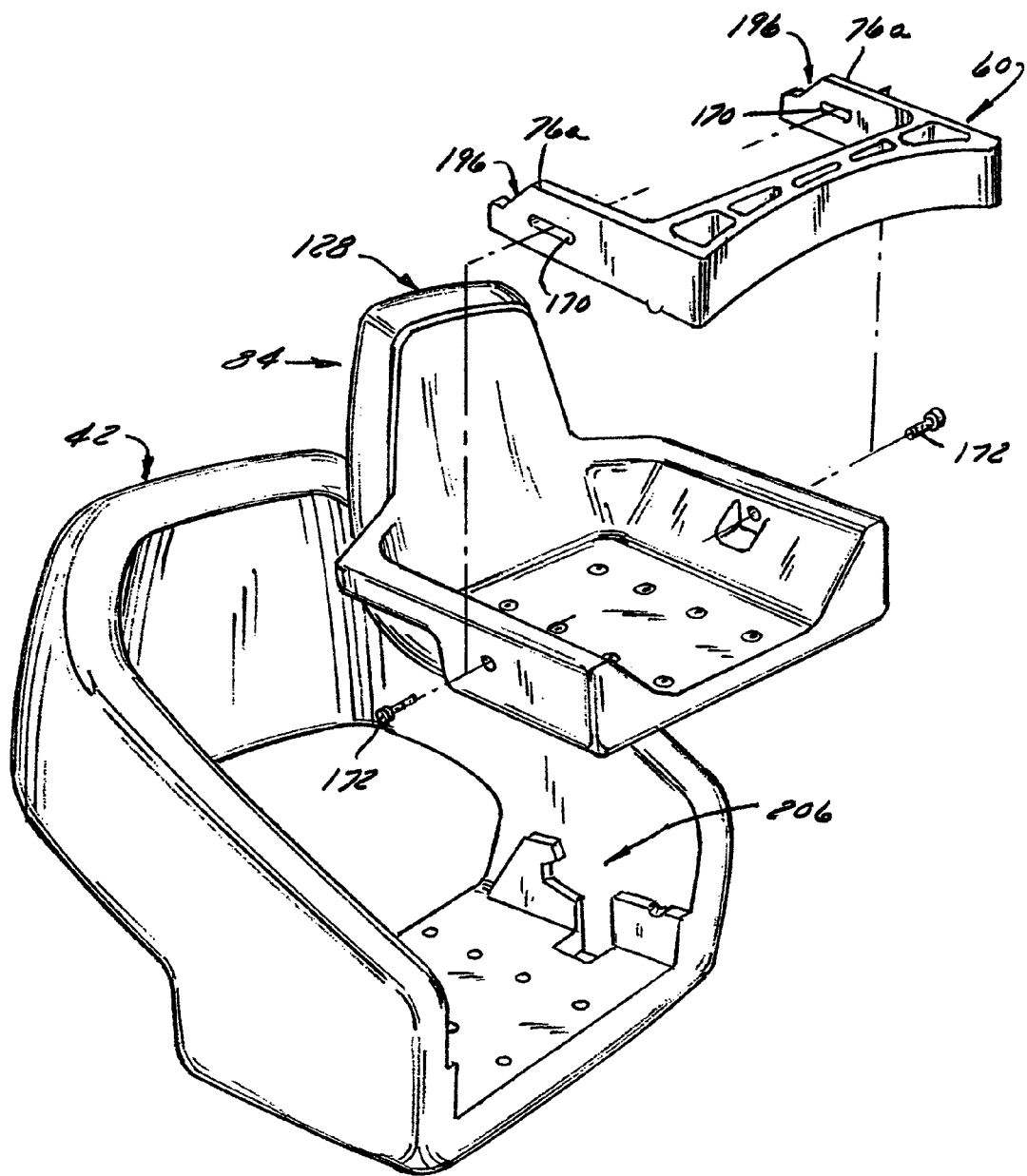
FIG. 22 is an exploded perspective view of still further preferred embodiment of a bolster, seat pan, and shell.
Figure 23:
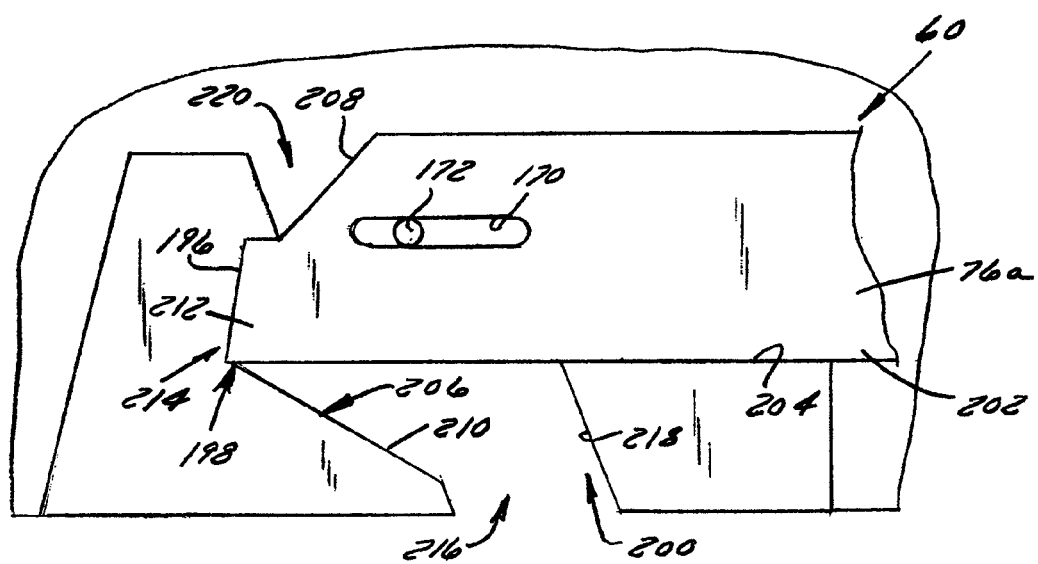
FIG. 23 is an enlarged fragmentary side elevation view depicting another preferred bolster cam and track arrangement with the bolster in a generally horizontal down position.
Figure 24:
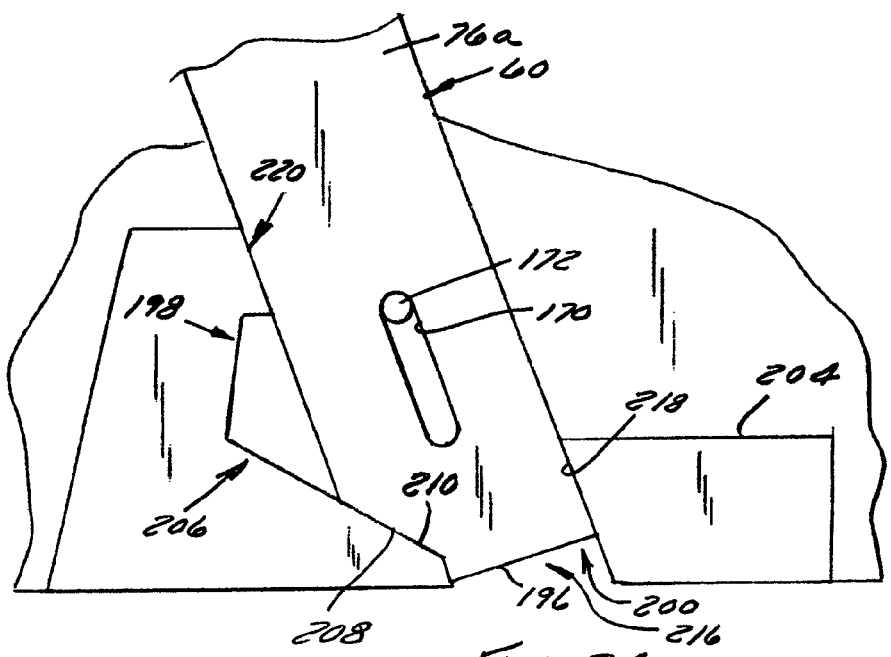
FIG. 24 is an enlarged fragmentary side elevation view depicting the preferred bolster cam and track arrangement of FIG. 23 with the bolster being releasably retained in a generally vertically extending upright position.

FIGS. 22-24 illustrate another embodiment of a bolster and cam track arrangement. FIG. 23 depicts a bolster arm 76a in a generally horizontal down position having a single cam 196 received in a horizontal or down position cradle 198. FIG. 24 depicts the bolster arm 76a in a generally upright position with its cam 196 received in an up position cradle 200.

When seated in the horizontal position cradle 198, force is required to lift the bolster 60 upwardly away from the generally horizontal position. When seated in the horizontal position cradle 198, a bottom edge 202 of the bolster arm 76a preferably rests on a generally horizontal bolster down stop 204 that prevents further downward bolster movement. The nose 212 of the arm 76a preferably also seats in a retainer notch 214 of the horizontal position cradle 198 and works in concert with the down stop 204 to ensure that the bolster 60 does not travel downwardly beyond the down position. The down stop 204 preferably is an edge of the shell or seat base against which the bottom edge 202 abuts against when the bolster 60 is in the down position.

When sufficient force is applied to cause the bolster 60 to begin lifting, the cam 196 begins sliding along a cam track 206 formed in the shell or seat base until the cam 196 approaches the up position cradle 200. As the bolster 60 is raised, the guide slot 170 and guide pin 172 move relative to each other such that the pin 172 moves relative to the slot 170 from adjacent one end of the slot 170 toward the opposite end of the slot 170. As the cam 196 approaches the up position cradle 200, a second abutment surface 208 of the bolster arm 76a comes into contact with a complementary abutment 210 of the cam track 206 and the nose 212 seats in a retainer pocket 216 of the up position cradle 200.

The abutment surface 208 preferably is acutely angled relative to a longitudinal axis of the bolster arm 76a. Further upward bolster movement beyond the upright position is constrained by a pair of spaced apart and opposed bolster up stops 218 and 220 that are preferably each located adjacent one of the cradles 198 and 200. When the cam 196 is received in the up position cradle 200, a force greater than that required to urge the cam free of the down position cradle 198 must be applied to urge the cam 196 free of the up position cradle 200.

If desired, in a preferred embodiment, each cam track is carried by or formed as part of the seat 52 or the shell 42. Where no shell 42 is used, these components are preferably carried by or integrally formed in a sidewall of the seat base 84 or seat pan 130 of the seat 52. Where formed as part of the shell 42, each cam track can be formed as a channel that extends all the way through one of the sidewalls of the shell 42.

In one preferred embodiment, the shell 42 is comprised of a molded plastic core that is overlaid with a covering (not shown) and padding in certain areas. The mold parting line preferably substantially coincides with at least one of the styling lines 78 and 80 of the shell 42. The mold also includes a plurality of projections that are each contoured to form each one of the cam tracks 174 and 176. The mold is also configured to integrally mold a fastener or a fastener retainer into each shell sidewall 46 and 48 between the upper and lower cam tracks 174 and 176. In a currently preferred embodiment, there is a T-nut (not shown) integrally molded into each shell sidewall 46 and 48 between the upper cam track 174 and the lower cam track 176.

Each bolster arm 76 is of one-piece, solid, unitary construction that need not be padded or covered during use and operation. As a result, friction between each arm 76 and the adjacent interior surface of the shell 42 during bolster movement is decreased, which makes bolster operation smoother as compared to prior art bolsters that are padded and completely covered. Each cam 178 and 180 is preferably integrally molded with the bolster arms 76. Preferably, each guide slot 170 is also formed in a like manner. If desired, the guide slot 170 can be formed using a material removal process that is performed after the bolster 60 is molded.

In assembly, the bolster 60 is aligned such that at least one arm 76 is disposed generally parallel to an inner surface of one of the shell sidewalls 46 or 48. At least one of the cams 178 or 180 and preferably both of the cams 178 and 180 of the bolster arm 76 are oriented such that they are generally in-line with an assembly clearance 236 (FIG. 4) formed in the inner surface of the shell sidewall 46 or 48. The bolster arm 76 is oriented such that the rear cam 178 is located closest to the lower cam track 176. The bolster arm 76 is then moved toward the lower cam track 176 such that the rear cam 178 clears the assembly clearance 236 in the process. Further movement of the bolster arm 76 toward the lower cam track 176 causes the rear cam 178 to register with the lower cam track 176. The bolster arm 76 is then maneuvered without flexing or bending and tilted slightly towards the inner shell sidewall until the front cam 180 is received in the upper cam track 174.

Thereafter, one of the pins 172 is inserted through the guide slot 170 in the bolster arm 76 until it engages the fastener retainer that is embedded in the shell sidewall. In a currently preferred embodiment, each pin 172 preferably is a bolt that is inserted through a corresponding guide slot 170 and threadably engaged with a T-nut (not shown) that is embedded in the shell sidewall. In this same manner, the other bolster arm 76 is securely attached to its corresponding shell sidewall.

It is also to be understood that, although the foregoing description and drawings describe and illustrate in detail one or more embodiments of the present invention, to those skilled in the art to which the present invention relates, the present disclosure will suggest many modifications and constructions as well as widely different embodiments and applications without thereby departing from the spirit and scope of the invention. For example, where beam springs are used in the suspension assembly, the beam springs may be attached to the seat pan using secondary springs, such as coil springs (not shown) extending between the ends of each beam spring and the seat pan, or by providing a cantilevered mount (not shown) with a desired resistance at each end of the beam springs. The present invention, therefore, is intended to be limited only by the scope of the appended claims and the applicable prior art.

It is claimed:

1. A vehicle seat suspension comprising:
   a seat base having a pair of spaced apart retainers;
   a beam spring carried by the retainers;
   a seat occupant load supporting suspension webbing of a flexible load bearing fabric carried by the beam spring and underlying a seat occupant supporting surface of the vehicle seat;
   a bearing carried by a portion of the beam spring received in each one of the retainers, each bearing disposed between the beam spring and an adjacent portion of the seat base;
   wherein the webbing is pre-tensioned;
   wherein each one of the retainers comprises (a) a land formed by part of the seat base on which a portion of the beam spring adjacent a corresponding end of the beam spring is supported, and (b) a retainer bar or finger formed by part of the base that overlies a portion of the beam spring at or adjacent the land;
   wherein the land of one of the retainers is spaced from the land of the other one of the retainers defining a recess therebetween enabling deflection of a portion of the beam spring unsupported by the lands during suspension operation; and
   wherein the beam spring and bearings are configured to provide a plurality of stages of deflection during suspension operation.

2. The vehicle seat suspension of claim 1 wherein the seat base is a molded plastic seat base with one of the retainers integrally formed in one part of the seat base and the other one of the retainers integrally formed in another part of the seat base.

3. The vehicle seat suspension of claim 1 wherein each one of the retainers comprises an upraised abutment adjacent the land and spaced from the part of the base overlying the corresponding portion of the beam spring received in the retainer against which a portion of the beam spring can abut.

4. A vehicle seat comprising:
   (a) a seat pan; and
   (b) a suspension assembly engaged with the seat pan, the suspension assembly including at least one elongate beam spring secured across the seat pan and flexible in a first direction and a supporting member secured across the seat pan and flexible in a second direction different than the first direction; and
   wherein the seat pan includes a first pair of aligned recesses and a second pair of aligned recesses spaced from the first pair of recesses, and wherein the suspension assembly includes a first beam spring extending between the first pair of recesses, and a second beam spring extending between the second pair of recesses, and the supporting member extending between the first beam spring and the second beam spring and attached thereto.

5. The seat of claim 4 wherein the supporting member is formed of a mesh grid.

6. The seat of claim 4 wherein the first beam spring has a spring rate different than the spring rate for the second beam spring.

7. The seat of claim 4 wherein the first beam spring has a length different than the second beam spring.

8. The seat of claim 4 wherein one beam spring is less compliant than the other beam spring.

9. The seat of claim 4 wherein the seat pan is comprised of plastic, wherein one recess of each one of the first and second pair of aligned recesses is disposed on one side of the seat pan and the other recess of each one of the first and second pair of aligned recesses is disposed on the other side of the seat pan, and wherein the supporting member comprises a pre-tensioned webbing made of a flexible, elastomeric and load bearing material.

10. The vehicle seat suspension of claim 4 wherein the supporting member comprises an elastomeric load bearing mesh secured under pre-tension to the first and second beam springs, wherein at least one of the first and second beam springs comprises a leaf spring, and wherein the seat pan comprises a molded plastic seat base.

11. A vehicle seat suspension comprising:
a seat base having a pair of spaced apart retainers;
a first beam spring carried by the retainers;
a seat occupant load supporting suspension webbing of a flexible load bearing fabric that is pre-tensioned and carried by the first beam spring and underlying a seat occupant supporting surface of the vehicle seat;
a second beam spring carrying the suspension webbing that is disposed rearwardly of the first beam spring and that extends generally parallel to the first beam spring;
wherein the seat base has a front and a rear with the first beam spring disposed in a sideways orientation relative to the seat base and disposed adjacent or along the front of the seat base; and
wherein the first beam spring is longer than the second beam spring.

12. The vehicle seat suspension of claim 11 wherein the suspension webbing is attached to the seat base adjacent or along the rear of the seat base.

13. The vehicle seat suspension of claim 11 wherein the suspension webbing is pre-tensioned such that the suspension webbing is elongated at least two percent with no load present and elongates no more than fifteen percent when under load during suspension operation.

14. The vehicle seat suspension of claim 11 wherein the first beam spring is less compliant than the second beam spring.

15. The vehicle seat suspension of claim 11 wherein the first beam spring has a spring rate lower than the second beam spring.

16. The vehicle seat suspension of claim 11 further comprising a seat cushion having a seat occupant supporting surface, wherein the seat cushion overlies at least a portion of the suspension webbing and the first beam spring, and wherein the seat cushion is supported by at least the suspension webbing and the first beam spring.

17. A vehicle seat suspension comprising:
a seat base molded of plastic having a pair of spaced apart retainer arrangements integrally formed therein;
an elongate member received in one retainer arrangement that comprises an elongate beam spring;
a plurality of bearings each disposed between the beam spring and the one retainer arrangement;
a load bearing suspension webbing comprised of a flexible elastomeric load bearing fabric or mesh that is pre-tensioned when attached to the beam spring and the other retainer arrangement, the suspension webbing extending from the beam spring to the other retainer arrangement;
a seat cushion having a seat occupant supporting surface with the seat cushion overlying the suspension webbing and supported by the suspension webbing; and
wherein the beam spring and bearings provide a plurality of stages of deflection during suspension operation.

18. The vehicle seat suspension of claim 17 wherein the one of retainer arrangements is constructed and arranged to orient the elongate member transversely relative to the seat base so the elongate member extends from or adjacent one side of the seat base to or adjacent another side of the seat base.

19. The vehicle seat suspension of claim 18 wherein the one of the retainer arrangements comprises a first retainer pocket integrally formed in one side of the seat base and a second retainer pocket integrally formed in the other side of the seat base with one end of the elongate member received in the first retainer pocket and the other end of the elongate member received in the second retainer pocket.

20. The vehicle seat suspension of claim 17 further comprising a second elongate member with one of the first and second elongate members disposed along a front of the vehicle seat base and the other one of the first and second elongate members disposed rearwardly of the one of the first and second elongate members with the first and second elongate members spaced apart so that the suspension webbing underlies substantially the entire seat occupant supporting surface.

21. A vehicle seat suspension comprising:
a seat cushion having a seat occupant supporting surface;
a seat base molded of plastic having a plurality of spaced apart retainer arrangements integrally formed therein;
a first elongate beam spring carried by one of the retainer arrangements;
a second elongate beam spring carried by the other one of the retainer arrangements;
a suspension webbing comprised of a flexible load bearing fabric or mesh attached to the first and second elongate beam springs extending therebetween, the suspension webbing underlying substantially the entire seat occupant supporting surface;
wherein one of the first and second beam springs has a spring rate or compliancy less than the other one of the first and second beam springs; and
wherein the one of the first and second beam springs having the lesser spring rate or compliancy is disposed along or adjacent a front of the seat occupant supporting surface.

22. A vehicle seat suspension comprising:
a seat base molded of plastic having a plurality of spaced apart retainer pockets formed therein;
an elongate beam spring received in the retainer pockets;
a suspension webbing comprised of a flexible load bearing fabric attached to the beam spring and extending outwardly therefrom supporting a load from a seat occupant;
wherein each one of the beam spring retainer pockets comprises a land formed of a portion of the seat base upon which part of the beam spring is supported and a finger or bar formed of another portion of the seat base that overlies the beam spring adjacent the land;
a bearing adjacent each land that is attached to the beam spring and disposed between the beam spring and seat base in the vicinity of the land; and
wherein the bearings and the beam spring provide a plurality of stages of deflection during suspension operation.

* * * * *

UNITED STATES PATENT AND TRADEMARK OFFICE
CERTIFICATE OF CORRECTION

PATENT NO.        : 7,837,273 B1
APPLICATION NO.   : 11/845872
DATED             : November 23, 2010
INVENTOR(S)       : Clifton J. Ratza et al.

Page 1 of 1

It is certified that error appears in the above-identified patent and that said Letters Patent is hereby corrected as shown below:

ON THE FACE

(73) Assignee:

Please amend the assignee to read:

-- Milsco Manufacturing Company, a Unit of Jason Incorporated --

Signed and Sealed this
Twenty-second Day of March, 2011

David J. Kappos
*Director of the United States Patent and Trademark Office*